US012174605B2

(12) United States Patent
Yaffe et al.

(10) Patent No.: US 12,174,605 B2
(45) Date of Patent: *Dec. 24, 2024

(54) RENEWABLE ENERGY ALLOCATION BASED ON GUIDED POSITION MATCHING

(71) Applicant: NewPartner Energy Technologies LLC, Larchmont, NY (US)

(72) Inventors: Noam Yaffe, Scarsdale, NY (US); Henry Yaffe, Scarsdale, NY (US); Yaniv Yaffe, Scarsdale, NY (US)

(73) Assignee: NewPartner Energy Technologies LLC, Larchmont, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/838,747

(22) Filed: Jun. 13, 2022

(65) Prior Publication Data
US 2022/0308541 A1    Sep. 29, 2022

Related U.S. Application Data

(63) Continuation of application No. 17/104,014, filed on Nov. 25, 2020, now Pat. No. 11,360,449.

(60) Provisional application No. 62/970,112, filed on Feb. 4, 2020.

(51) Int. Cl.
*G05B 19/042*   (2006.01)
*G06Q 10/0635*  (2023.01)
*H04L 67/12*    (2022.01)

(52) U.S. Cl.
CPC ....... *G05B 19/042* (2013.01); *G06Q 10/0635* (2013.01); *G05B 2219/2639* (2013.01); *H04L 67/12* (2013.01)

(58) Field of Classification Search
CPC .......... G05B 19/042; G05B 2219/2639; G06Q 10/0635; H04L 67/12; Y02P 90/02; Y04S 40/18
See application file for complete search history.

(56) References Cited

U.S. PATENT DOCUMENTS

2010/0218108 A1   8/2010   Crabtree et al.
2010/0332373 A1*  12/2010  Crabtree ................ G06Q 40/04
                                                    709/224

* cited by examiner

*Primary Examiner* — Chad G Erdman
(74) *Attorney, Agent, or Firm* — VOLENTINE, WHITT & FRANCOS, PLLC

(57) ABSTRACT

A system is caused to: send a first template of selectable options to a first computer; receive a second template with selections based on a subset of the selectable options from the first template; create, based on the selections based on the subset of the selectable options from the first template, a customized third template of selectable options; provide, to a second computer controlled by a second party; the customized third template; receive selections based on the selectable options in the customized third template; and determine when the selections based on the selectable options in the customized third template match the selections based on the subset of the selectable options from the first template. Renewable energy from the power plant is allocated based on determining when the selections based on the selectable options in the customized third template match the second template.

10 Claims, 13 Drawing Sheets

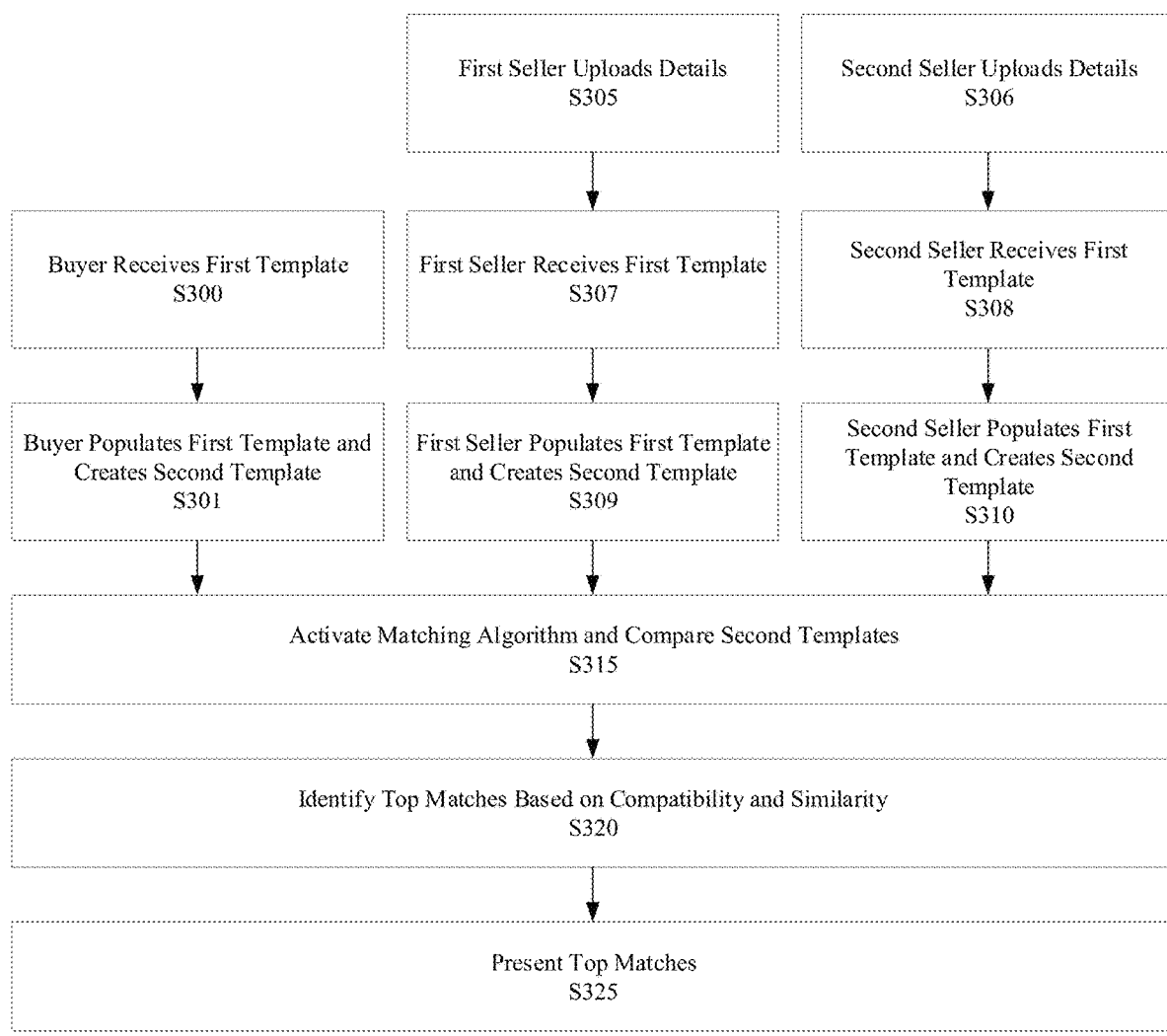

RENEWABLE ENERGY ALLOCATION BASED ON GUIDED POSITION MATCHING

CROSS-REFERENCE TO RELATED APPLICATION

This U.S. non-provisional patent application claims the benefit of priority under 35 U.S.C. § 120 to U.S. patent application Ser. No. 17/104,014, filed on Nov. 25, 2020 in the United States Patent and Trademark Office, and under 35 U.S.C. § 119 to U.S. Provisional Patent Application No. 62/970,112, filed on Feb. 4, 2020 in the United States Patent and Trademark Office, the disclosures of which are incorporated herein in their entirety by reference.

BACKGROUND

Demand for renewable energy is sharply increasing for a variety of reasons including competitive economics and concerns about the environmental impacts of carbon and other greenhouse gas emissions from the power sector. Renewable energy includes energy created or generated by a renewable energy generator/facility including, for example, electricity generated by solar and wind facilities. New development of renewable energy projects sometimes requires new battery storage and distribution facilities. As new renewable energy sources are developed and brought into operation, legacy carbon-based energy sources such as coal power plants may be taken out of production in some places, thereby reducing emissions, and in many places significantly reducing electricity costs for consumers. To date, the development, implementation, and long-term financial maintenance of renewable energy generation facilities almost always relies on the ability of the power plant owner, operator, and/or asset manager to hedge at least a portion of future revenues in order to be able to withstand potential power price volatility and shocks. Representatives of renewable energy facilities typically originate and structure agreements to sell electricity and renewable energy attributes to various buyers at pre-defined prices so that the facilities and their lenders can contractually establish a level of financial certainty as to the future performance of the facility and its ability to stay financially healthy and solvent. However, reliance on conventional contracting mechanisms for negotiating these agreements between buyers and sellers of renewable energy too often results in unnecessary financial risk and delays in developing and bringing new renewable energy sources into operation. Innovative contracting mechanisms can help developers accelerate their project development timelines, reduce development and operating costs, and improve the economics of their generation facilities to benefit electricity consumers.

Historically, contracts known as power purchase agreements (PPAs) for renewable energy were largely facilitated by utilities based on governmental subsidies or renewable energy mandates. Today, the levelized cost of renewable energy from some renewable energy sources over the lifetimes of the renewable energy sources is significantly lower than the levelized costs of generating electricity from legacy carbon-based sources like coal power plants. Additionally, over the last few decades, some geographic areas of the United States have been organized into independent system operators and regional transmission organizations with electricity markets and pricing signals, allowing various companies in the electricity and finance sector to participate in market-making and make better infrastructure planning and development decisions. The competitive costs of renewable energy coupled with the existence of wholesale and retail electricity markets has created an opportunity for energy buyers such as private corporations to participate directly by purchasing renewable energy from power plant developers via PPAs or Virtual PPAs ("VPPA"), sometimes circumventing their utilities all together. Other companies, such as load serving entities and retail electric providers, also play an important role in purchasing renewable energy via PPA or VPPA on behalf of their customers.

Financial instruments for developing renewable energy sources and bringing renewable energy sources into operation are often complex, and buyers and sellers sometimes do not realize the true extent of the risks, rights, and obligations being incurred until late in the negotiation process, or even after contracts have been executed. And, sometimes, the dynamics of conventional contracting mechanisms significantly favor one counterparty over the other, forcing one side to accept high risk terms. Negotiations based on conventional mechanisms may take more than a year as proposals and counterproposals are passed back and forth and then reviewed, often with expensive attorneys and advisors. As an example, corporations and other private energy buyers are increasingly choosing to purchase renewable energy in order to benefit from competitive economics, to actively participate in the fight against climate change, and to be able to truthfully claim that they are offsetting their carbon and other greenhouse gas emissions. Since most corporations are not in the business of renewable energy and lack expertise in the field, the corporations may hire advisors to run auctions and/or procure renewable energy at the lowest price. However, renewable energy PPAs are typically complex and may require expensive financial advisers and specialized lawyers to complete. The process is time consuming, expensive, indirect, and typically requires travel, exchanges of email and telephone calls, and creation of sophisticated spreadsheet models that are prone to human error. Too often, the conventional process leads to PPAs and VPPAs with low prices and aggressive terms that may not meet the minimum requirements of a viable contract, thereby impeding, for example, the developer's ability to properly secure project financing. Too often, non-compliance with requirements is found only after the PPA/VPPA is executed and after much time and money has already been invested.

Due to the complex dynamics described above, renewable energy projects that rely on the PPA/VPPA too often require re-negotiation, incur expensive project delays, and are even sometimes abandoned with financial penalties and damages. Ultimately, the development delays and inefficiencies are more than likely impeding the ability of the private sector to grow the renewable energy industry at a fast enough rate to reduce carbon and other greenhouse gas emissions per the requirements outlined by organizations like the Intergovernmental Panel on Climate Change, which is the body within the United Nations that assesses the science related to climate change, or the 2016 Paris Agreement that outlined how the international community should combat climate change together.

Renewable energy allocation based on guided position matching leverages technological mechanisms to significantly improve the accuracy and the rate at which renewable energy sources are developed and brought into operation. These technological mechanisms are designed to significantly cut the amount of time and cost required to develop a renewable energy facility, benefiting both consumers and the environment, as well as governments seeking to aggressively combat climate change. Moreover, aspects of renewable energy allocation based on guided position matching may be applicable outside of renewable energy development and production, such as for other forms of complex negotiations.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3B illustrates another method for renewable energy allocation based on guided position matching, in accordance with a representative embodiment.

DETAILED DESCRIPTION

Figure 1A:
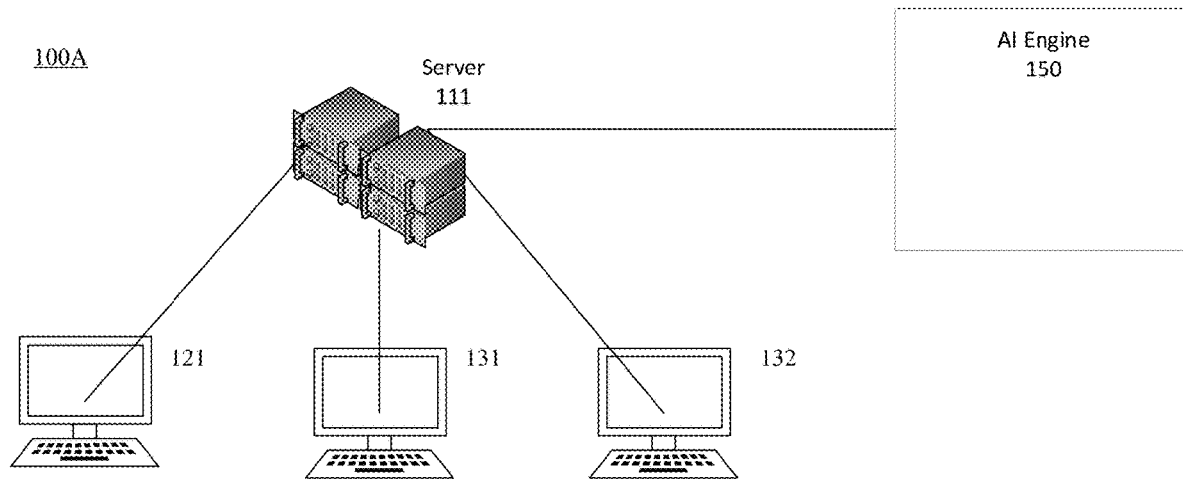
FIG. 1A illustrates a system for renewable energy allocation based on guided position matching, in accordance with a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, renewable energy allocation based on guided position matching may provide for development of renewable energy power plants and allocation of renewable energy power plant capacity and/or electricity production with renewable energy attributes. The allocation may be made for existing power plants or power plants under development even in early stages of development.

The guided position matching may provide for decreasing the cost of developing renewable energy power plants, increasing the speeds by which renewable energy power plants are developed and by which renewable energy can be generated, increasing the accuracy of renewable energy financial instruments used to develop renewable energy power plants, and improving the efficiency of the process by which capacity/production/renewable energy attributes from renewable energy power plants is/are allocated. The tools described herein may enhance the abilities of parties to renewable energy transactions to properly originate, structure, evaluate, and negotiate PPAs/VPPAs. The tools described herein are expected to accelerate the pace of renewable energy procurement and project financing.

Renewable energy allocation based on guided position matching may be implemented using software provided to renewable energy buyers such as corporations, renewable energy sellers such as developers, and renewable energy investors such as lenders to manage the origination and renewable energy deal structuring processes, as well as a neutral (unbiased) database of information and analytics for parties trying to purchase, develop, or invest in renewable energy. A suite of features such as forms, bid and offer risk-weighting adjustments, template contract printing, opportunity screening, database interface, predictive analytics, investor marketing templates, automated negotiation, risk detection, and other related features are described herein to enable efficient completion of negotiations for renewable energy allocation based on guided position matching. The risk-weighting may reflect risks to contract performance, contract or project financing, and other types of risks such as risks that a proposal will not be favorably comparable to other proposals when presented to a requester.

FIG. 1A illustrates a network arrangement for renewable energy allocation based on guided position matching, in accordance with a representative embodiment.

In FIG. 1A, the network 100A includes a server 111, a first networked communications device 121, a second networked communications device 131 and a third networked communications device 132. The server 111 is connected to AI Engine 150. The server 111, first networked communications device 121, second networked communications device 131, third networked communications device 132 and the AI Engine 150 communicate over one or more communications networks such as the internet (not shown). The AI Engine 150 applies artificial intelligence to dynamically recommend and analyze selections from templates as described herein.

In the embodiment of FIG. 1A the server 111 may implement renewable energy allocation based on guided position matching on behalf of an entity that provides the renewable energy allocation based on guided position matching as a service. For example, the server 111 may be owned, leased and directly or indirectly controlled by an entity that provides the service.

The first networked communications device 121, the second networked communications device 131 and the third networked communications device 132 are all networkable computing devices such as personal computers, laptop computers, smartphones or tablet computers. Each of the first networked communications device 121, the second networked communications device 131 and the third networked communications device 132 includes or is provided along with a monitor or other type of electronic screen to display information. The networks that connect the first networked communications device 121, the second networked communications device 131 and the third networked communications device 132 may include the internet, but also may include private and dedicated proprietary communications networks and/or network connections.

In FIG. 1A, the server 111 hosts a software application on behalf of a service provider, and the server 111 may control or even directly implement most or all of the functionality of methods described herein. However, the first networked communications device 121, the second networked communications device 131 and the third networked communications device 132 may each also or alternatively be provided with applications installed thereon to execute one or more aspects of the methods described herein.

The AI Engine 150 in FIG. 1A may apply trained artificial intelligence to selections from templates as described herein. The trained artificial intelligence may be recursively updated based on each instantiation of successful matches between requesters and proposers. As a result, a current instantiation of the trained artificial intelligence may be based on previous instantiations of the artificial intelligence applied to successful matches between requesters and proposers as described herein.

Figure 1B:
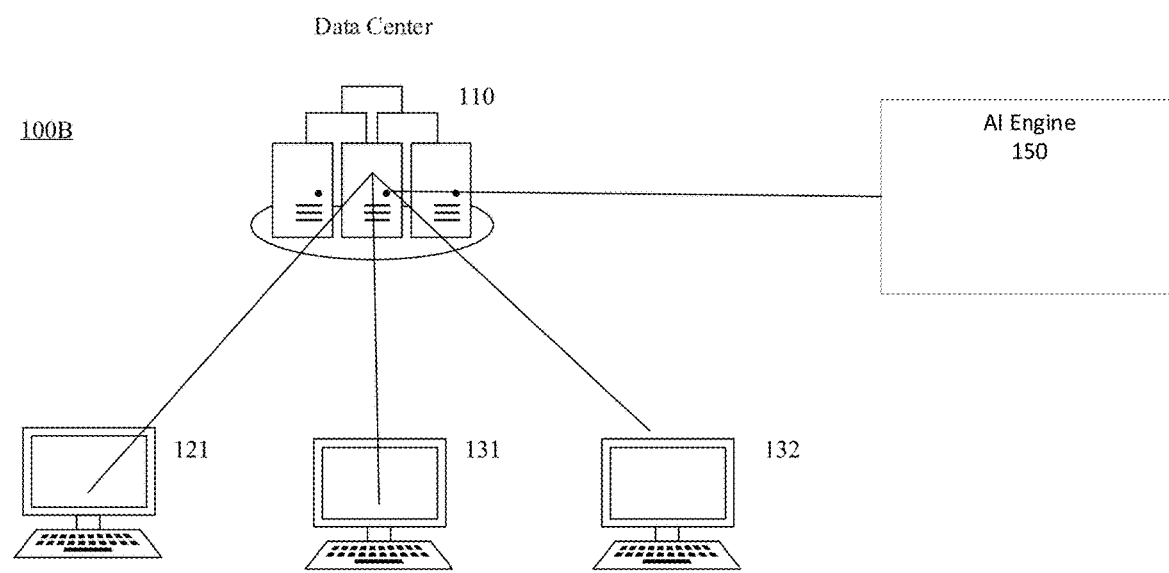
FIG. 1B illustrates another system for renewable energy allocation based on guided position matching, in accordance with a representative embodiment.

FIG. 1B illustrates another network arrangement for renewable energy allocation based on guided position matching, in accordance with a representative embodiment.

In FIG. 1B, the network 100A includes a data center 110, the first networked communications device 121, the second networked communications device 131 and the third networked communications device 132. The data center 110 is connected to the AI Engine 150. The data center 110, the first networked communications device 121, the second networked communications device 131, the third networked communications device 132 and the AI Engine 150 communicate over one or more communications networks such as the Internet (not shown). The AI Engine 150 provides artificial intelligence to dynamically recommend and analyze selections from templates as described herein. The AI Engine 150 may also apply trained artificial intelligence to selections from templates as described herein, as well as to generate or assist in generating first templates and second templates as described herein. The first templates and second templates are forms that may be dynamically updated such as when users make selections of selectable options, and the selections may then be fed to the AI Engine 150. Selections based on the selectable options in second templates as described herein may be fed to the artificial intelligence implemented by the AI Engine 150 dynamically to analyze the selections.

In the embodiment of FIG. 1B the data center 110 may implement renewable energy allocation based on guided position matching as a service on behalf of an entity that provides the renewable energy allocation based on guided position matching. For example, the data center 110 may be representative of a cloud service that hosts and executes software applications as services for entities including the entity. The data center 110 may include multiple servers such as the server 111 from FIG. 1A. The multiple servers provided by a cloud service may variably implement renewable energy allocation based on guided position matching as a service, such as an on-demand service. For example, one or more of the servers provided by a cloud service may be selectively controlled to implement the service based on availability dynamically on-demand or as a periodic (e.g., daily) service. In other embodiments, renewable energy allocation based on guided position matching may be provided under a software license as a complete software package sold over the internet or on a computer-readable medium.

In FIGS. 1A and in FIG. 1B, the second networked communications device 131 and the third networked communications device 132 are shown as devices used by proposers responding to a request to receive proposals. However, fewer than two or more than two proposers may respond to a request to receive proposals in embodiments described herein. A proposer can be a seller or a buyer or both. Insofar as proposers may be competing with one another, a server-based system for allocating renewable energy from a power plant may be implemented by the server 111 and/or the data center 110 and may identify a subset of proposals that are received responsive to the request for proposals. The subset of proposals may be based on second templates. The server-based system implemented by the server 111 and/or the data center 110 may analyze the full set of proposals that are based on the second templates, and identify the subset of proposals as those most closely matching the selected options in the first template, and return the subset of proposals to a requester as a short list.

In the embodiments of FIG. 1A and FIG. 1B, renewable energy allocation based on guided position matching may be implemented using software executed by the server 111 and/or the data center 110 for renewable energy buyers such as corporations and utilities, renewable energy sellers such as developers and long-term asset owners, and renewable energy investors such as credit support or collateral providers, tax equity investors, cash equity investors, and lenders to manage the origination and renewable energy deal structuring processes. The server 111 and/or the data center 110 are programmed to provide templates for renewable energy PPAs and interactively guide buyers and sellers in dynamically selecting selectable options in the templates to efficiently reach PPAs that are implementable for developing renewable energy. The server 111 and the data center 110 may be accompanied with one or more neutral (unbiased) database(s) of information and analytics. The software provided from the server 111 and/or the data center 110 is used to implement a suite of features such as forms, bid and offer risk-weighting adjustments, template contract printing, opportunity screening, database interface, predictive analytics, investor marketing templates, and other related features that are described herein to enable efficient completion of negotiations for renewable energy allocation based on guided position matching.

Figure 12:
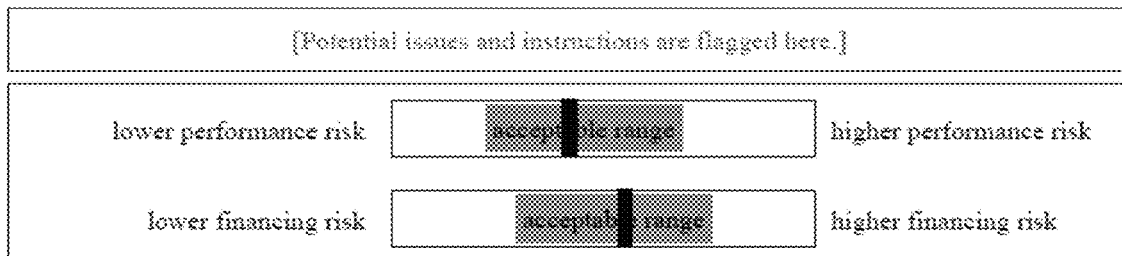
FIG. 12 illustrates a completed second template, in accordance with a representative embodiment.

The server 111 and the data center 110 may implement risk adjustment for selections in second templates as proposers enter the selections. Each selection may be assigned a risk-weighting factor that is usable to help determine the overall risk profile of the proposal if the proposal results in a PPA. Each proposal may be presented to the requester on a risk-adjusted basis, so the proposers are provided with risk adjustments as selections are made based on the risk-weighting factors assigned to selections. The weights for each term may be initially set as defaults presented to the requesters in the first templates, and the requesters may be provided the opportunity to update the default weights. The risk adjustment may then be used to dynamically calculate and present an assessment of risk to the proposers as the proposers select selectable options in the second templates. In other words, the software used to implement renewable energy allocation based on guided position matching may assign risk-weighted values for each offer or bid received. Additionally, the AI Engine 150 may be used to adjust risk by updating default weights or weights adjusted by requesters. The adjustment of risk by the AI Engine 150 may be based on analysis of successful and unsuccessful proposals in the past. An example of a completed second template with a set of risk indications at the top is shown in FIG. 12.

Figure 2:
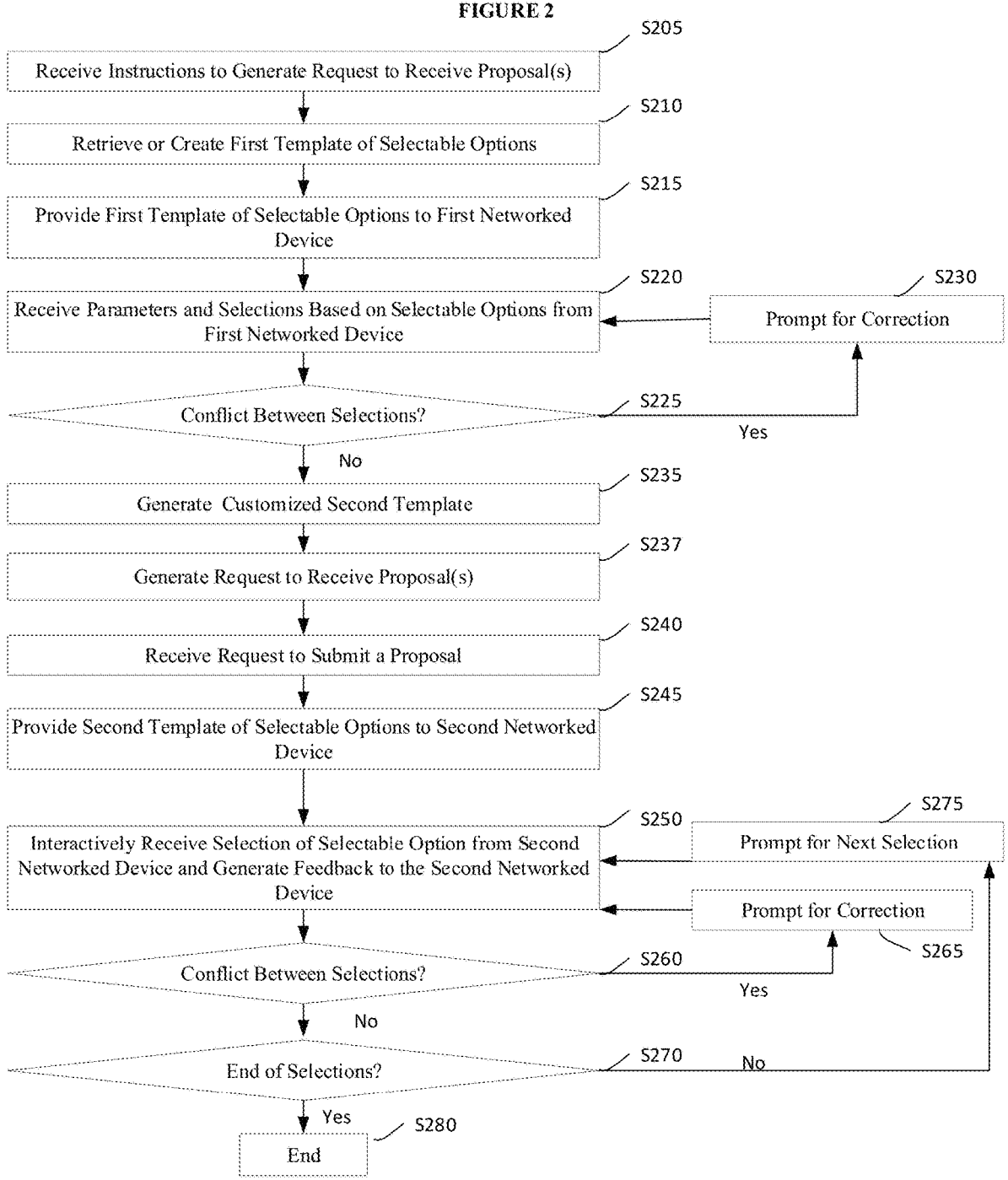
FIG. 2 illustrates a method for renewable energy allocation based on guided position matching, in accordance with a representative embodiment.

FIG. 2 illustrates a method for renewable energy allocation based on guided position matching, in accordance with a representative embodiment.

In FIG. 2, the method starts at S205 by receiving instructions to generate a request to receive one or more proposal(s). For example, the request may be received from a first party who wishes to obtain renewable energy by paying a renewable energy developer or seller for energy from a renewable energy power plant under development. Financial instruments setting agreeable terms for such ventures are typically complex and involve back and forth negotiations where the requester ultimately finds that proposers are not ready to meet expectations, so the system that implements the method of FIG. 2 is provided to automatically intermediate the requester and proposers so as to hasten completion of the energy facility that will provide the renewable energy.

At S210, a first template of selectable options is retrieved or created. In some embodiments, the first template is not provided from a service to a computer over a communications network, and instead may be provided by an advisor such as a financial advisor or legal advisor or renewable energy advisor for example, such as when the advisor has a set of pre-populated first templates to provide to clients for different scenarios. The first template may be created as a copy of a master template that is reusable as a starting point for parties who wish to create a request to receive one or more proposal(s). For example, the master template may be a read-only document and the first template created at S210 may be a revisable copy of the master template. The master template may include all potential selectable options in the universe relevant to requesters. The master template may include terms such as the preferred settlement type, the quantity of megawatt-hours (MWh), the preferred credit support type and amounts, the expected or guaranteed 'commercial operation date' of a development project as well as types of financial attributes such as contract structure, contract duration, and other types of attributes as described herein.

The selectable options in the first template may include terms that are each assigned a weight so that a determination of a match may be based on weights applied to each of multiple selectable options in the second template. A weighting system that assigns the weights to the terms may be predetermined or may be dynamically customizable by a requester each time a first template is used to create a request to receive proposals. An example of a weighting system may be a system that applies numerical weights to selectable options based on how risky the selectable options are relative to other selectable options for parties directly impacted by a potential transaction. Another example of a weighting system may be a system that applies changes to a discount rate that is used to value a customized financial instrument such as a custom forward commodity contract. Another example of a weighting system may be a system that tags specific selectable options or combinations of selectable options as severely or unnecessarily risky for parties directly impacted by a potential transaction. A more specific example may be when a selection of a selectable option in the second template is in the center of a preferred range for a term that is weighted heavily, the selection of the selectable option may be weighted more heavily than if the selection of the selectable option was outside of the preferred range, or vice versa. Also, for example, when a selection of a selection option in the second template is outside of the preferred range, the weight of that selectable option may be increased relative to the weight of other selection options so as to warn or caution the requester and evaluator of a proposal about one or more elements of the proposal. In some embodiments, all terms may be set to have the same risk weighting to avoid unwanted biases by a requester or a proposer.

At S215, the first template of selectable options is provided to a first networked device. The first template may be a master template for multiple types of financial instruments, or may be a master template that is pre-customized for a particular type of financial instrument. For example, the first template may be customized for the owner/operator of the first networked device to procure renewable energy in the future from power plants that are currently under development.

At S220, parameters and selections based on a subset of the selectable options are received from the first networked device. The parameters and selections may include selections of terms to include in a financial instrument, parameters for the terms (including setting a term to 'non-negotiable'), and rules to apply to the parameters including rules to apply for combinations of parameters for different terms that may result in conflicts, non-compliance, or proposal disqualification.

At S225, a determination is made whether there is a conflict between selections. The determination of whether there is a conflict is based on predetermined logic set for the first template (i.e., for the master template). An identified conflict may result in non-compliance with initial selections in a master template, or a proposal that is commercially unreasonable or unnecessarily risky. Conflicts between terms may be set to guide proposers to a compliant alternative or a better way to propose an offer that avoids unreasonable commercial terms or unnecessary risk. For example, a master template may include several conflicting options for terms, and when a user selects two conflicting terms the second selection may be recognized as creating a conflict. After a conflict is created, a helpful hint may be provided to guide the requester to alternative and compliant term selection combinations designed to facilitate better overall proposals. The helpful hint may be generated and provided via the service that provides the renewable energy allocation based on guided position matching, whether renewable energy allocation based on guided position matching is provided as a subscription or as a licensed software product embedded on a computer-readable medium.

At S230, if there is a conflict between selections (S225=Yes), the method includes prompting for a correction and then returning to S220. Correcting a conflict may not always be required to complete the template. The prompt for a correction may be provided via the user interface, such as via a pop-up window or a notification or highlighted text underneath the conflicted terms, and may simply advise that there is a conflict between selections in the first template. The prompt may suggest that the user change one of the selections. The user may also be prevented from making other selections until the prompt can be removed by resolving the recognized conflict.

If there is no conflict between selections at S225 (S225=No), the method of FIG. 2 includes generating a customized second template at S235. The customized second template is generated at S235 once all required selections are received for the first template. The required selections may include terms, parameters for the terms, and rules for the parameters. The customized second template is customized based on preferences, requirements and settings from the selections received from the first template via the first networked device. The second template may simply be created by a user accepting the selections of terms, parameters for the terms, and rules for the parameters from the first template. The user may confirm acceptance of the selections from the first template via a computer such as using a cloud-based system described in FIG. 1A, or verbally or in writing.

At S237, the request to receive one or more proposal(s) is generated. The request is generated based on the completion of the first template at S210, and may be generated and sent before the customized second template is generated at S225. Alternatively, the request to receive one or more proposal(s) may be created after the customized second template is generated at S225.

At S240, a request to submit a proposal is received. The request to submit a proposal is submitted by a proposer using a networked communications device, and may be submitted via a webpage, via email, or via a customized graphical user interface when proposals are sent by a proprietary communications network.

At S245, a second template of selectable options is provided to a second networked device. The second template of selectable options is based on the selections of the selectable options in the first template, and reflects selections of parameters for terms in the first template as well as the rules set for the parameters of the terms in the first template.

At S250, the method of FIG. 2 includes interactively receiving a selection of a selectable option from the second networked device and generating feedback to the second networked device. Details of S250 are explained further with respect to FIG. 6. For example, the server 111 in FIG. 1A may guide the second party and provide real-time feedback for the second party based on the selections based on the selectable options in the second template. Guidance provided from the server-based system that includes the server 111 may also include a representation of a risk of a mismatch for at least one selection of the selectable options in the second template. Guidance provided from the server-based system that includes the server 111 may also include a representation of a risk of a mismatch for multiple selections based on the selectable options in the second template.

At S260, a determination is made whether a rule is broken and there is a conflict between selections. The determination at S260 may be made based on a rule that specifies two or more parameters for two or more terms specified in the second template. Multiple rules may be applicable to the second template, and the rules may be created or customized by the first party. Rules may have varied levels of severity; some may be deal-breakers and others may be warnings. In some embodiments, a proposer may be allowed to submit a non-compliant proposal that breaks rules. The service may automatically put non-compliant proposals into a "non-compliant" pile similar to a junk-mail folder in email systems. Additionally, some rules may apply based on a single selection, such as a selection of a parameter within a particular date range or above a specified price or interest rate, and this may result in a warning or a prompt for correction even though the rule only applies to one selection.

At S265, if there is a conflict between selections (S260=Yes), the proposer may be prompted for a correction and the method of FIG. 2 then returns to S250. The prompt may be provided via a user interface, and may specify the conflict between selections. For example, when the user of the second template selects a parameter for a term that conflicts with a previous selection for another term, the user may be prompted to change either the current selection and/or the previous selection. The user may also be provided with an explanation and guidance in real-time. In some embodiments, the determination at S265 may include a determination whether an individual selection violates a rule, such as when a selection is outside of a range of selectable options and violates a rule applied to one or more parameters defining the range.

If there is no conflict between selections and no individual selection violates a rule (S260=No), the method of FIG. 2 includes determining at S270 whether the end of selections has been reached. If one or more additional selection(s) are to be made (S270=No), the method of FIG. 2 includes prompting for a next selection at S275 and then returning to S250. If there are no selections left to be made ((S270=Yes), the method of FIG. 2 ends at S280.

The method of FIG. 2 may be implemented by software provided by the server 111 and/or the data center 110. The software may include user interfaces or downloadable modules provided to user devices such as the first networked communications device 121, the second networked communications device 131 and the third networked communications device 132. The software may be provided in one or more programming languages such as object-oriented programming languages including Python with a web framework such as Django and a database management system such as PostgreSQL. The software may also be implemented using one or more compiled and/or non-object-oriented programming language such as C, for example. Alternatively, renewable energy allocation based on guided position matching may be implemented based on alternate forms of internet-based communications as the medium of interaction such as email and mobile and non-mobile messaging systems.

Figure 3A:
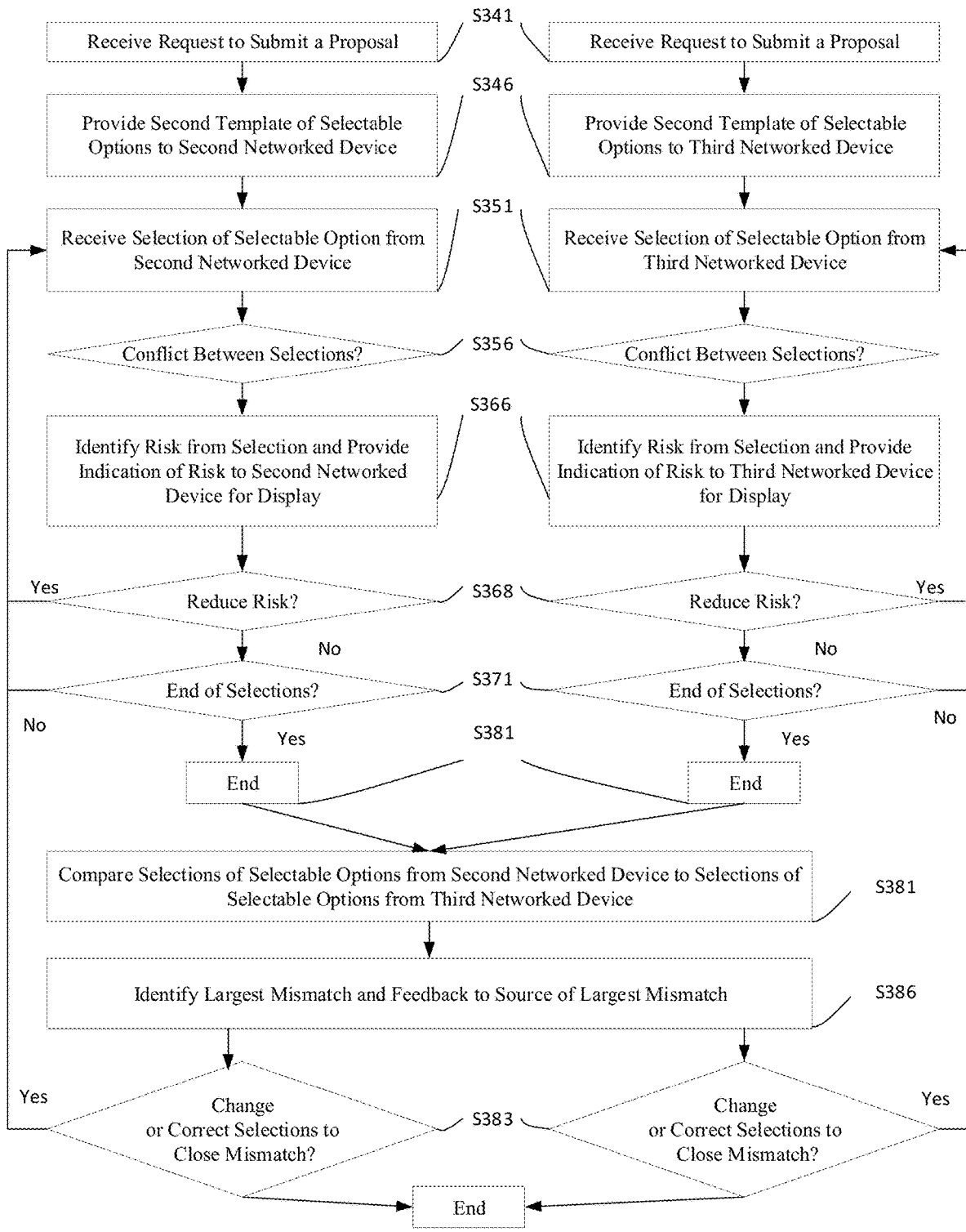
FIG. 3A illustrates another method for renewable energy allocation based on guided position matching, in accordance with a representative embodiment.

FIG. 3A illustrates another method for renewable energy allocation based on guided position matching, in accordance with a representative embodiment.

In FIG. 3A, two parallel processes are performed between a second networked device and a first networked device as well as between a third networked device and a first networked device. The first of the two parallel processes is shown on the left in FIG. 3A, and the second of the two parallel processes is shown on the right in FIG. 3A. Both of the two parallel processes are designated by the same reference numbers in FIG. 3A. Also, though the two processes are performed in parallel in FIG. 3A, this should not be taken to mean that the beginning, the end, or any intermediate steps are necessarily performed simultaneously. Rather, the two parallel processes are independent of one another unless otherwise noted.

At S341, a request to submit a proposal is received. The request to submit the proposal may be received from a second party on the left and from a third party on the right. The request may be received by the server 111 in FIG. 1A or the data center 110 in FIG. 1B.

At S346, a second template of selectable options is provided. The second template is based on the selections in the first template, such as by selections made via the first networked communications device 121. The server 111 in FIG. 1A or the data center 110 in FIG. 1B provide the second template to the second party on the left and to the third party on the right.

At S351, a selection of a selectable option is received. The selection of the selectable option is received iteratively from the second party on the left and from the third party on the right. The selection of the selectable option is typically but not necessarily always a selection of a parameter for a term for a customizable financial instrument. The selection may be a specific value set as part of a proposal. The selection may be, for example, a specific value to propose. An example of a customizable financial instrument is one that may be defined by the United States Commodities Futures Trading Commission as a "forward contract" with terms selectable by a requester.

At S356, a determination is made as to whether a conflict between selections in the second template exists. The determination at S356 is based on comparing the most recent selection with one or more rules defined previously in the first template by the first party. An algorithm may apply each of a set of rules to the most recent selection by first seeing if the corresponding term is part of the rule and, if so, if the selection itself falls under the relevant part of the rule. If the most recent selection falls under the relevant part of the rule, the algorithm checks the other parts of the rule to check which other term(s) are part of the rule and if selections have been made for the other term(s). If the selections have been made for the other term(s) which are part of the rule, the algorithm checks whether the previous selections fall under the other relevant part of the rule. If the current selection and the previous selection both fall within the rule, the rule is checked to see whether the selections are compliant with the rule or whether two selections cannot exist together under the rule. One or more rules may be applied to restrict a combination of selections based on the selectable options in the second template. Sometimes a rule may apply only to the parameters set by the requester (via the first networked device) on the selectable options of a term and may not necessarily require comparison with selectable options of more than one term. For example, a rule may apply to a single parameter, such as by requiring a selection to fall within a range.

When the most recent selection results in a conflict between selections under a rule, the proposer may be provided an option to change the most recent selection for the current term or a previous selection for a previous term that invoked the rule.

At S366, the method of FIG. 3A includes identifying a risk from the selection received at S351, and providing an indication of the risk for display. The indication of the risk may be a visual indication such as a heatmap or shades of red, yellow, or green marking that display the severity of the overall risk profile of the permutation of selections in a proposal or individual selections. The indication of the risk may show different types of risk, such as one end representing a risk that the customizable financial instrument will not result in an agreement based on the selection and the other end representing a risk that the proposer is being too generous and is therefore losing value unnecessarily as a result of the selection. Another example of a risk that may be indicated is the risk that selected selectable options or combinations of selected selectable options and their downstream effects are unlikely to be compatible with lending criteria, thereby resulting in a high likelihood of the development project not being able to secure adequate project financing.

The network 100A in FIG. 1A and the network 100B in FIG. 1B provide mechanisms for risk-adjusting offers and bids and standardizing and reducing costs of buying or selling renewable energy or renewable energy assets. The mechanisms described herein empower buyers such as corporations and utilities, sellers such as developers, and investors such as lenders to manage processes and risk-adjust renewable energy bids and offers for contract terms and possibly even their downstream effects. The terms of the customizable financial instruments described herein may be complex and, by design, cover requirements beyond price. The mechanisms described herein provide for adjusting offers and bids for contract and financing and performance risk, assisted by a database of accessible analytics and risk-weighting functions. Proposals with contract permutations with a higher likelihood of resulting in a risky outcome for buyer or seller or both may be deprioritized in relation to proposals with contract permutations that are more likely to result in improved outcomes for one or more parties, including third parties such as investors.

An example of the result of the application of risk-weighting is a determination of customized discount rates for each customized financial instrument proposed by proposers of the second or third networked devices. Either the system or the requester at the first networked device can preset discount rate adjustments that are to be applied to selectable options and ultimately to a customized financial instrument defined by the combination of multiple selectable options in the second template. For example, a selectable option for term #1 may adjust the discount rate by 50 basis points (bps) if selected by the proposer so that when calculating the present value of two customized financial instruments based on the second template, and when the two customized financial instruments may be differentiated by one term selection, different discount rates may be applied to the same set of cash flows resulting in different present value calculations for the two customized financial instruments. The determination of the discount rate may be performed once the selectable options are selected. The discount rate may be used to decide the value of the proposals, and ultimately to recommend a winner or a short list of potential winners. Although only one selectable option has been used in this example, each selectable option in a template can have an associate discount rate adjustment that would result in a change to the overall discount rate of the customized financial instrument if that selectable option is selected.

At S371, a determination is made as to whether an end of the selections is reached. When the end of the selections is reached, the parallel processes end. To be sure, the parallel processes are not necessarily performed simultaneously. Rather, the parallel processes may be performed in parallel during a set time period. For example, the requester may set a period of 30 days to receive proposals after the date that the requester sends out the request to receive proposals, and each proposer may be able to provide selections of selectable options in the second template on one day and then update selections of selectable options one or more times on subsequent days or simply create one or more new proposals.

At S381, selections of selectable options from the second networked device are compared to selections of the selectable options from the third networked device. At S381, the selections from different second templates are compared to see whether one set of selections compares poorly to the other set of selections. For example, a selection from one of the second templates may be on the lower end of the acceptable range of months and years for the customizable financial instrument set by the first party, and the corresponding selection from another of the second templates may be in the preferred range set by the first party. Alternatively, a series of selections from the different templates may be compared to see if one of the parties can be prompted to update the selection to improve their proposal.

The comparison at S381 may be used to rank and/or score second templates from two or more proposers. For example, two intermediate or completed templates may be scored based on how well they match with the selections from the first template based on differences from optimized selections set by the requester and weights either automatically assigned for each term or dynamically adjusted by the requester for one or more terms. Scores may reflect a simple sum of weighted inputs where each input reflects the weight assigned to the selection and the relative difference from an optimized selection such as a suggested range or even an ideal target set by the requester.

At S386, the process of FIG. 3A identifies the largest mismatch present in the selectable options from the second networked device and present in the selectable options from the third networked device. The system that implements the method of FIG. 3A provides feedback to the second networked device or the third networked device based on identifying the largest mismatch, so that the second networked device or the third networked device is given the opportunity to update their selections to reduce the magnitude of the mismatch and improve their chances of ultimately being selected by the requester. In some embodiments, the process of FIG. 3A does not require the "largest" mismatch, and instead may require the most significant mismatch such as when terms are assigned with different weights that reflect their significance. In other embodiments, the process of FIG. 3A may identify one or more mismatches, and may provide feedback to the second networked device or the third networked device to suggest updating one or more mismatches to reduce the magnitude of mismatch.

Although not shown in FIG. 3A once the second templates from the second networked communications device 131 and the third networked communications device 132 are completed, the server 111 may identify a "top candidate(s)" that best-matches the completed first template from the first networked communications device 121. The "top candidate" may be identified by a recommendation to the first networked communications device 121, and may reflect the ranking or scoring described above. Additionally, the recommendation may include a comparison of key differences between two or more of a short list of multiple best-matched completed second templates, including an indication of how key selections in the completed second templates from the short list differ. The best-matched completed second templates may not be based solely or even partially on a proposal with the lowest price. For example, given the weighting and ranking used to identify matches, a proposal with the lowest price may not necessarily be included on even the short list of multiple finalists among a larger set of proposers.

FIG. 3B illustrates another method for renewable energy allocation based on guided position matching, in accordance with a representative embodiment.

In FIG. 3B, three parallel processes are performed between a first network device which may be used by a buyer or requester, a second networked device which may be used by a first seller or proposer, and a third networked device which may be used by a second seller or proposer. In FIG. 3, sellers or proposers may pre-populate second templates in order to be matched with buyers or requesters based on an automated match. Although two sellers and one buyer are represented in FIG. 3B, the teachings described herein are not limited to one or two sellers or buyers. Instead, numerous buyers may pre-populate second templates as described below, and any number of sellers may also generate second templates at any time as otherwise described herein. The three parallel processes shown in FIG. 3 are not necessarily simultaneous. Rather, the three parallel processes may be independent of one another until and unless any of the sellers are matched with the buyer.

At S300, the buyer at the first networked device receives a first template for renewable energy from the server 111 in FIG. 1A or the data center 110 in FIG. 1B.

At S301, the buyer at the first networked device creates a second template by selecting terms and parameters in the first template, typically but not necessarily in order to create a template for a customizable financial instrument such as one that may be defined by the United States Commodities Futures Trading Commission as a "forward contract." Rules may be created by the buyer using the first networked device as well. The selections at the first networked device may be made, for example, by a buyer of renewable energy or by an agent or proxy such as an advisor to a prospective renewable energy buyer.

At S305 and S306, the first seller at the second networked device and the second seller at the third networked device upload information regarding their renewable energy power plants or renewable energy development projects. The information uploaded at S305 and S306 can include data such as project name, location, and other identifying details. The details uploaded to S305 and S306 are not necessarily proprietary and may not be required for the matching process in FIG. 3B. The first seller at the second networked device and the second seller at the third networked device may, for example, be renewable energy sellers.

At S307 and S308, the first seller at the second networked device and the second seller at the third networked device receive first templates for renewable energy from the server 111 in FIG. 1A or the data center 110 in FIG. 1B. As an example, the first seller and the second seller may independently receive a master first template by request.

At S309 and S310, the first seller at the second networked device and the second seller at the third networked device create second templates by selecting terms and parameters for the terms, typically but not necessarily in order to create a template for a customizable financial instrument such as one that may be defined by the United States Commodities Futures Trading Commission as a "forward contract." Rules for the terms and parameters for the terms may be created as well.

At S315, a matching algorithm is activated and the relevant second templates are fed to the matching algorithm. The matching algorithm may be implemented by the server 111 or the data center 110, and/or may be fully or partially implemented by client software distributed to the second networked device and the third networked device. The matching algorithm may be activated by, for example, the buyer at the first networked device who is seeking matches for the second template that was created at S301. Alternatively, the matching algorithm may be activated periodically such as once a day, or any time a new second template is received from a buyer or seller. The matching algorithm compares selections in each of the second templates from the second networked device and third networked device (e.g., the sellers) to selections from the second template from the party at the first networked device (e.g., the buyer). In an embodiment, a matching algorithm may compare selections in second templates from multiple different buyers to selections in second templates from each of multiple different sellers.

At S320, renewable energy allocation based on guided position matching identifies the top matches based on compatibility and similarity of all of the second templates that had been fed to the matching algorithm in S315. In some embodiments, buyers and/or sellers may be guided in the manner described herein to update their selections based on feedback generated by the matching algorithm, such as feedback showing terms and/or parameters that were important factors in not being identified for one or more matches.

At S325 the matches may be presented back to the entity that activated the matching algorithm. In this representative embodiment, the entity that activated the matching algorithm is the buyer at the first networked device. In an embodiment, both of the customized second templates from each of the second networked device and the third networked device match and are presented to the party at the first networked device. In another embodiment, none of the customized second templates form each of the second networked device and the third networked device match and therefore none are presented to the party at the first networked device. In another embodiment, a subset of the second templates from the second networked device and the third networked device match and are then presented to the party at the first networked device.

Accordingly, in embodiments based on FIG. 3B, a buyer at the first networked device may be able to select and accept a second template in order to pursue a transaction with a party at either the second networked device or third networked device (or both). Second templates from buyers and sellers may be stored by a service that provides the server 111 and the data center 110, and may be applied to the matching algorithm each time a new second template is newly received from a buyer or seller.

Figure 4:
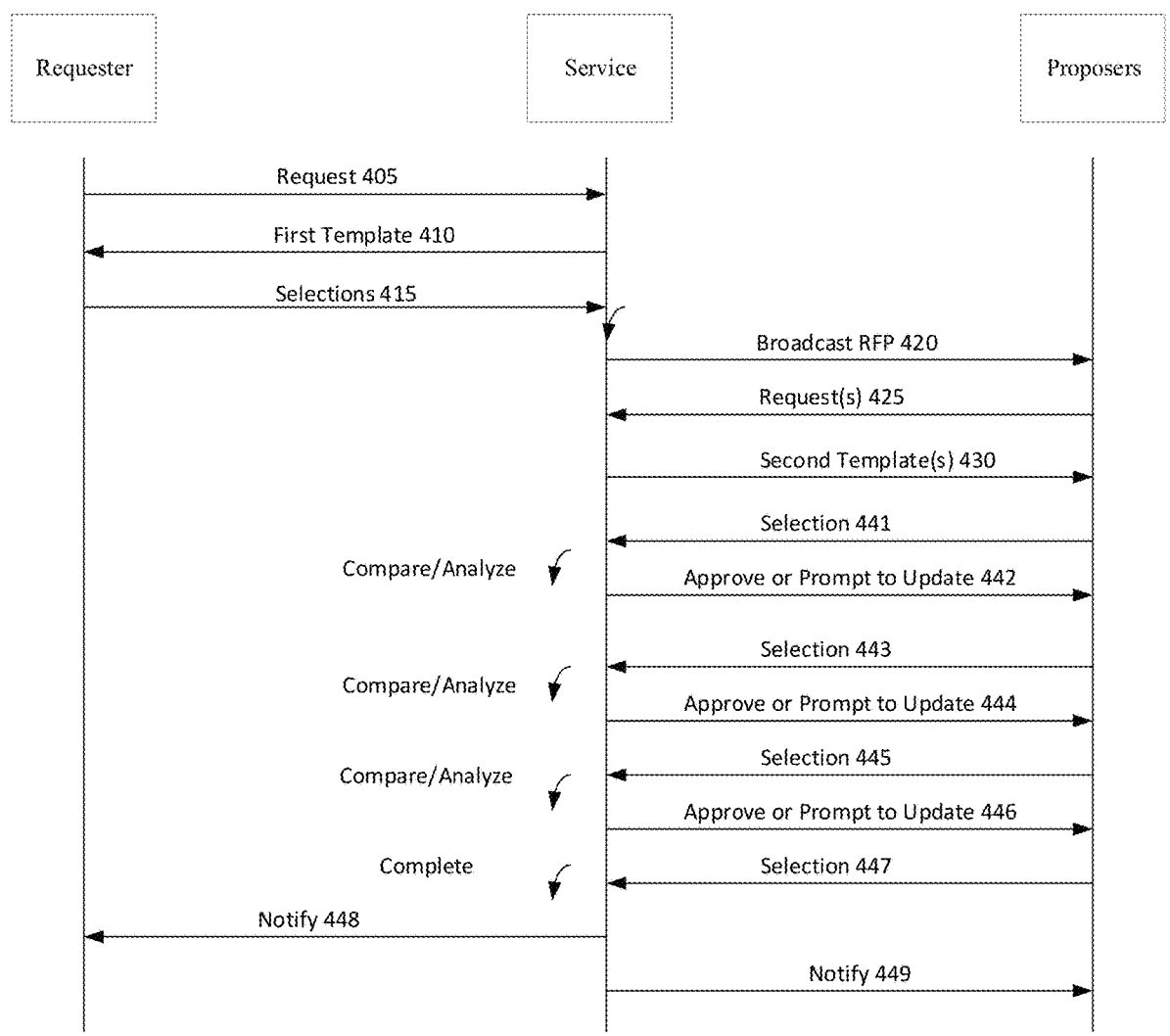
FIG. 4 illustrates a signal flow for renewable energy allocation based on guided position matching, in accordance with a representative embodiment.

FIG. 4 illustrates a signal flow for renewable energy allocation based on guided position matching, in accordance with a representative embodiment.

In FIG. 4, the signal flow is shown between a requester, a service, and proposers. The requester in FIG. 4 may correspond to the first networked communications device 121 in FIG. 1A and FIG. 1B. The service in FIG. 4 may correspond to the server 111 in FIG. 1A or the data center 110 in FIG. 1B. The proposers in FIG. 4 may correspond to the second networked communications device 131 and the third networked communications device 132 in FIG. 1A and FIG. 1B.

At 405, a request is sent from the requester to the service. The requester may request a first template from the service. For example, the first template may be a master template for a specific type of customizable financial instrument. The service may store and update different types of first templates for different types of customizable financial instruments, and may provide them on request.

At 410, the service sends a first template to the requester. The first template may be a default master template. The service may create and store master templates for a variety of different types of customizable financial instruments, and the first template may be a customizable financial instrument of a particular type selected by the requester.

At 415, the requester receives selections from the first template from the requester. The service analyzes the selections. The selections from the first template are used to create the second template. Insofar as the second templates are customized second templates that are customized based on the selections from the requester, it may be unlikely that any two set of second templates will be identical.

Additionally, the selections received at 415 may include terms to include in the customized financial instrument, selectable parameters for the terms, and rules to apply based on sets of multiple parameters. The customizable financial instrument may be a customized renewable energy financial instrument for financing or otherwise developing power plants that provide renewable energy. The rules may include limits for parameters for different terms. For example, a first rule may require that any financial instrument lasting more than X years must be accompanied by a structural guarantee of at least Y. The requester may select multiple rules to limit selections of parameters. Enforcement of such rules on proposers later may help ensure that agreements can be reached much faster, even when the customizable financial instruments are complex and involve numerous specific terms.

At 420, the service broadcasts a request to receive proposals to the proposers. For example, the service may send a request to receive proposals to a list of recipients who have expressed interest in receiving such proposals. The broadcast may be made by email, text message, a wire service, facsimile, a proprietary computer network that connects the requester and the recipients, and so on. The broadcast may also be made via a proprietary application installed on communications devices used by potential proposers. The application may be available from an online application store.

At 425, the service receives a request from a proposer. The service may receive multiple requests from different proposers at 425, and may respond to each request or may filter the requests to ensure the requests are from authorized proposers. The requests may be received by email, text message, a wire service, facsimile or a proprietary computer network that connects the proposer and the requester.

At 430, the service sends a second template to the proposer. The second template is based on the selections received at 415 and include customized parameters and rules. Additionally, the second template may be sent to each proposer who requests the second template so as to prepare and submit a proposal.

At 441, the proposer sends a selection based on the second template to the service. The service analyzes the selection. The selection may be one of the parameters for one of the terms selected by the requester and received at 415.

At 442, the service approves the selection or prompts the proposer to update the selection. For example, the service may apply one of the rules received at 415 to the parameter if the rule involves the parameter and another parameter for another term. If no rules apply to the parameter, or the rule does not prohibit or limit the selection, the service may approve the selection. If one or more rules apply to the parameter, the proposer may be prompted to change the current selection or another previous selection of a parameter that invoked the rule. Or, for example, the service may notify the proposer that its selection is compliant, but on an extreme end of a permissible range, thereby potentially exposing either the proposer or requester or another related party to potential risk.

At 443, the proposer sends a selection based on the second template to the service. The service analyzes the selection. The selection may be one of the parameters for one of the terms selected by the requester and received at 415.

At 444, the service approves the selection or prompts the proposer to update the selection. If no rules apply to the parameter, or a rule that applies does not prohibit or limit the selection, the service may approve the selection. If one or more rules apply to the parameter, the proposer may be prompted to change the current selection or another selection of a parameter that invoked the rule.

Additionally, a proposer may be allowed to submit a non-compliant proposal that breaks rules. The service may automatically put non-compliant proposals into a "non-compliant" pile similar to a junk-mail folder in email systems. Moreover, a proposer submitting a non-compliant proposal may be provided with an ability to explain why the requester may wish to consider the non-compliant proposal, including links to terms and parameters selected in the first template that the proposer indicates should be changed.

At 445, the proposer sends a selection based on the second template to the service. The service analyzes the selection. The selection may be one of the parameters for one of the terms selected by the requester and received at 415.

At 446, the service approves the selection or prompts the proposer to update the selection. If no rules apply to the parameter, or a rule that applies does not prohibit or limit the selection, the service may approve the selection. If one or more rules apply to the parameter, the proposer may be prompted to change the current selection or another previous selection of a parameter that invoked the rule.

At 447, the proposer sends a selection based on the second template to the service. The service analyzes the selection and completes the proposal from the proposer. For example, the selection received at 447 may be the last selection of a parameter required in order to complete the selections from the second template.

At 448, the service notifies the requester. The requester may be notified each time a proposer completes submissions based on the second template. For example, the requester may hold proposals based on the request to receive proposals open for a set period such as two weeks or thirty days.

At 449, the service notifies the proposer. The proposer may be simply notified that the submission process is complete. However, as explained herein, the proposer may be notified to monitor communications since updated selections may be subsequently requested.

Figure 5A:
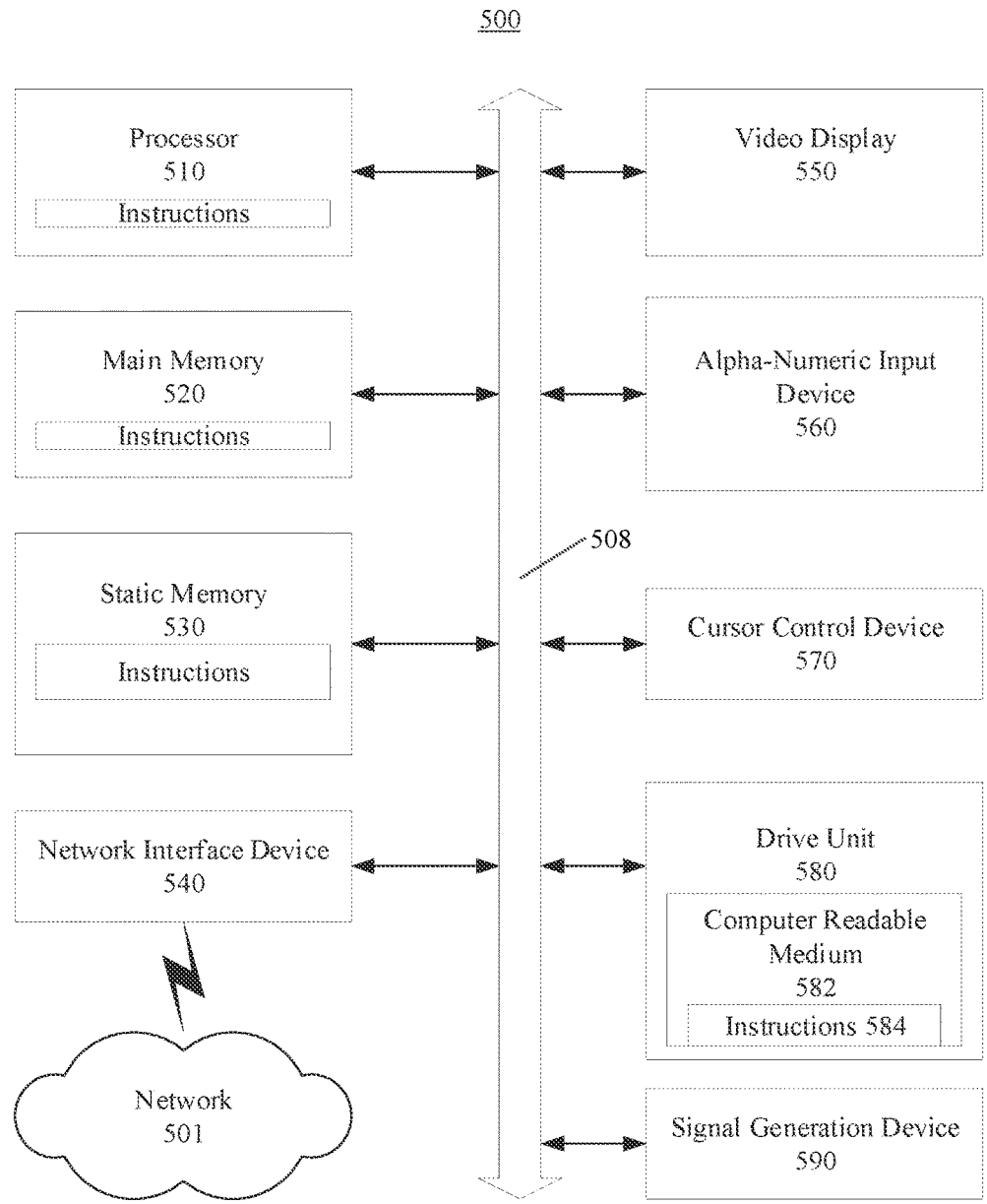
FIG. 5A illustrates a computer system, on which a method for renewable energy allocation based on guided position matching is implemented, in accordance with another representative embodiment.

FIG. 5A illustrates a computer system, on which a method for renewable energy allocation based on guided position matching is implemented, in accordance with another representative embodiment.

The computer system 500 of FIG. 5 shows a complete set of components for a communications device or a computer device. However, a "controller" as described herein may be implemented with less than the set of components of FIG. 5, such as by a memory and processor combination. The computer system 500 may include some or all elements of one or more component apparatuses in a system for renewable energy allocation based on guided position matching herein, although any such apparatus may not necessarily include one or more of the elements described for the computer system 500 and may include other elements not described.

Referring to FIG. 5, the computer system 500 includes a set of software instructions that can be executed to cause the computer system 500 to perform any of the methods or computer-based functions disclosed herein. The computer system 500 may operate as a standalone device or may be connected, for example, using a network 501, to other computer systems or peripheral devices. In embodiments, a computer system 500 performs logical processing based on digital signals received via an analog-to-digital converter.

In a networked deployment, the computer system 500 operates in the capacity of a server or as a client user computer in a server-client user network environment, or as a peer computer system in a peer-to-peer (or distributed) network environment. The computer system 500 can also be implemented as or incorporated into various devices, such as the controller 190 in FIG. 1A, a stationary computer, a mobile computer, a personal computer (PC), a laptop computer, a tablet computer, or any other machine capable of executing a set of software instructions (sequential or otherwise) that specify actions to be taken by that machine. The computer system 500 can be incorporated as or in a device that in turn is in an integrated system that includes additional devices. In an embodiment, the computer system 500 can be implemented using electronic devices that provide voice, video or data communication. Further, while the computer system 500 is illustrated in the singular, the term "system" shall also be taken to include any collection of systems or sub-systems that individually or jointly execute a set, or multiple sets, of software instructions to perform one or more computer functions.

As illustrated in FIG. 5, the computer system 500 includes a processor 510. The processor 510 may be considered a representative example of the processor 192 of the controller 190 in FIG. 1 and executes instructions to implement some or all aspects of methods and processes described herein. The processor 510 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 510 is an article of manufacture and/or a machine component. The processor 510 is configured to execute software instructions to perform functions as described in the various embodiments herein. The processor 510 may be a general-purpose processor or may be part of an application specific integrated circuit (ASIC). The processor 510 may also be a microprocessor, a microcomputer, a processor chip, a controller, a microcontroller, a digital signal processor (DSP), a state machine, or a programmable logic device. The processor 510 may also be a logical circuit, including a programmable gate array (PGA), such as a field programmable gate array (FPGA), or another type of circuit that includes discrete gate and/or transistor logic. The processor 510 may be a central processing unit (CPU), a graphics processing unit (GPU), or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 500 further includes a main memory 520 and a static memory 530, where memories in the computer system 500 communicate with each other and the processor 510 via a bus 508. Either or both of the main memory 520 and the static memory 530 may be considered representative examples of the memory 191 of the controller 190 in FIG. 5B, and store instructions used to implement some or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 520 and the static memory 530 are articles of manufacture and/or machine components. The main memory 520 and the static memory 530 are computer-readable mediums from which data and executable software instructions can be read by a computer (e.g., the processor 510). Each of the main memory 520 and the static memory 530 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 500 further includes a video display unit 550, such as a liquid crystal display (LCD), an organic light emitting diode (OLED), a flat panel display, a solid-state display, or a cathode ray tube (CRT), for example. Additionally, the computer system 500 includes an input device 560, such as a keyboard/virtual keyboard or touch-sensitive input screen or speech input with speech recognition, and a cursor control device 570, such as a mouse or touch-sensitive input screen or pad. The computer system 500 also optionally includes a disk drive unit 580, a signal generation device 590, such as a speaker or remote control, and/or a network interface device 540.

In an embodiment, as depicted in FIG. 5, the disk drive unit 580 includes a computer-readable medium 582 in which one or more sets of software instructions 584 (software) are embedded. The sets of software instructions 584 are read from the computer-readable medium 582 to be executed by the processor 510. Further, the software instructions 584, when executed by the processor 510, perform one or more steps of the methods and processes as described herein. In an embodiment, the software instructions 584 reside all or in part within the main memory 520, the static memory 530 and/or the processor 510 during execution by the computer system 500. Further, the computer-readable medium 582 may include software instructions 584 or receive and execute software instructions 584 responsive to a propagated signal, so that a device connected to a network 501 communicates voice, video or data over the network 501. The software instructions 584 may be transmitted or received over the network 501 via the network interface device 540.

Figure 5B:
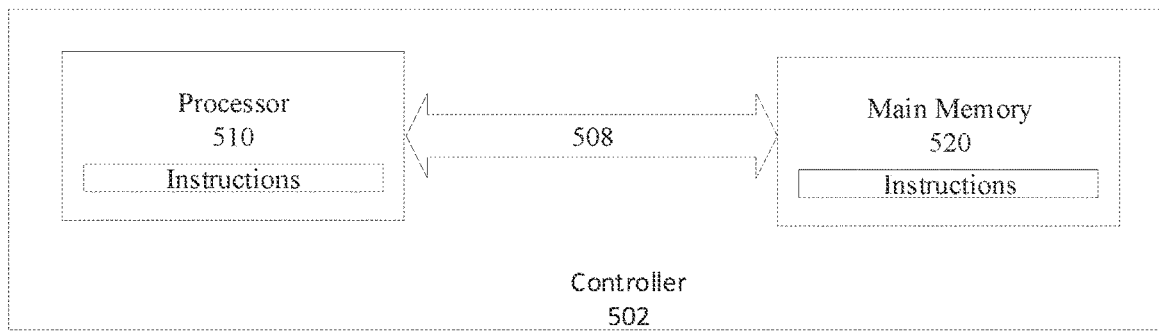
FIG. 5B illustrates how a controller that implements aspects of a method for renewable energy allocation based on guided position matching is implemented, in accordance with another representative embodiment.

FIG. 5B illustrates a controller that implements aspects of a method for renewable energy allocation based on guided position matching is implemented, in accordance with another representative embodiment.

In FIG. 5B, the controller 502 includes a processor 510 and a main memory 520 that are connected by a bus 508. The main memory 520 stores instructions used to implement some or all aspects of methods described herein, and the processor 510 executes the instructions used to implement some or all aspects of methods described herein. As an example, the controller 502 may be implemented by one or more servers that centrally implement renewable energy allocation based on guided position matching as described herein.

Figure 6:
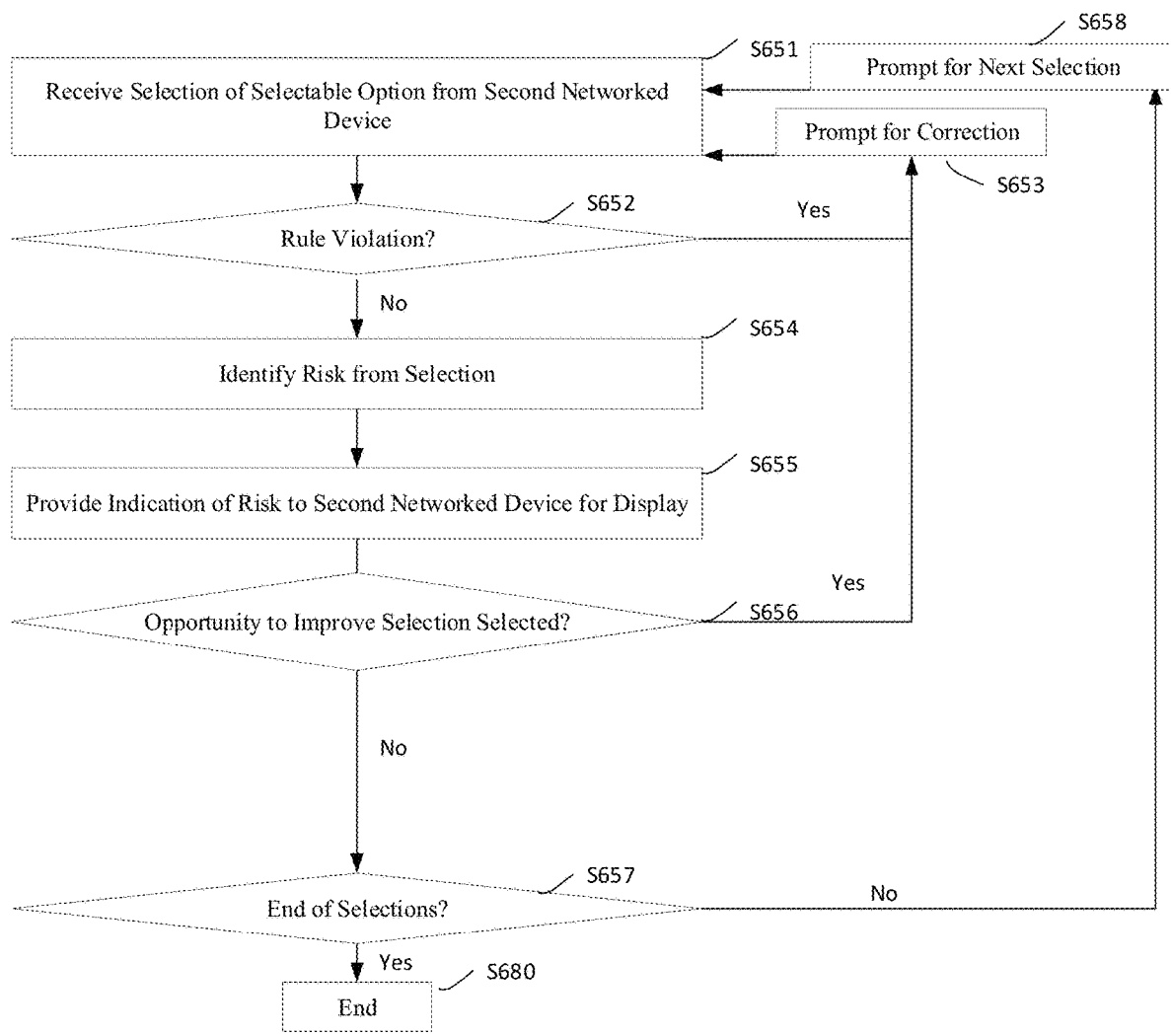
FIG. 6 illustrates another method for renewable energy allocation based on guided position matching, in accordance with a representative embodiment.

FIG. 6 illustrates another method for renewable energy allocation based on guided position matching, in accordance with a representative embodiment.

The method of FIG. 6 may correspond to the features of S250 in FIG. 2 according to an embodiment.

At S651, the method of FIG. 6 starts by receiving a selection of a selectable option from a second networked device. The second networked device may be a proposer who was invited to submit a proposal in a request to receive proposals. The selectable options may be selectable options in a second template, and the second template may be based on selections of selectable options in a first template via a first networked device.

At S652, a determination is made whether the selection of the selectable option at S651 results in a rule violation. The rule is a logical rule implemented by software, and may impose limitations on selections of specified parameters for specific terms. The rules may be invoked once a second parameter specified by the rule is selected. Resolution of a rule violation may be implemented by allowing the proposer to update either the selection at S651 or another selection of a parameter that is also part of the rule.

Rules as described herein may involve more than two parameters. For example, a rule may specify that if a parameter for term #1 is greater than X and a parameter for term #12 is less than Y, than a parameter for term #23 may only be option A or option B but not option C.

If the selection of the selectable option at S651 results in a rule violation at S652 (S652=Yes), at S653 the method of FIG. 6 includes prompting for a correction of the selection and then returning to S651. The prompting for the correction at S653 may include specifying the reason why the opportunity is presented when the prompting is based on the rule violation determined at S652. A correction may not always be required before a proposal is submitted, though a non-compliant proposal may be electronically steered to a "non-compliant" pile similar to a junk-mail folder in email systems.

If the selection of the selectable option at S651 does not result in a rule violation at S652 (S652=No), at S654 the method of FIG. 6 includes identifying a risk from the selection of the selectable option at S651.

At S655, an indication of the risk is provided to the second networked device for display. For example, the server 111 in FIG. 1A or the data center 110 in FIG. 1B may dynamically update models for risk and value for each selection at S655, or for some but not all selections at S655. The selection may result in a comparison of consequences such as downstream effects. The comparison may show the relative risk and/or valuation of the selections before the most recent selection and after the most recent selection. The relative risk/and or valuation may be presented via a graphical user interface, such as via a heatmap. The downstream effects may be calculated, projected and modeled on an ongoing basis before, after, or during the process of selecting options from the second template, so that changes in risk and/or value may be identified for each selection.

In some embodiments, S652 and S655 may be provided on a screen at the same time. Although FIG. 6 showing a linear path from S652 to S655, one or more checks may be provided simultaneously, providing the proposer with more information on how to optimize an offer.

In an embodiment, each selection may result in an update to risk and/or value models for the proposer making the selection or the requester who created the second template, and the updated models may be compared to models for other proposers who have already made selections based on the same initial second template. The comparison may result in a warning that the risk has increased for any party involved in the potential transaction, the value (e.g., present value) of the customized financial instrument has decreased, or that the models are not favorably comparable to the model(s) from other proposers. In this way, proposers may be able to interpret the information being provided to them via the interface while drafting their proposal in order to improve their proposals for the requester. The risk-adjustment analysis enables dynamic feedback to a proposer that serves as guidance which guides the proposers towards positions more likely to result in agreement.

At S656, a determination is made as to whether an opportunity to improve the current selection is selected. The opportunity to improve the current selection may be provided via a user interface that presents the second template to the proposer in FIG. 6. The opportunity to improve the current selection may be provided selectively after the selection is made. For example, the opportunity to improve the selection in FIG. 6 may be made when the proposer selects a parameter within a range allowed by the requester but not within a preferred range specified by the requester. The opportunity to improve the current selection may be presented after one or more selections, not necessarily all selections.

If the opportunity to improve the current selection is selected (S656=Yes), at S653 the method of FIG. 6 again includes prompting for a correction of the selection and then returning to S651. The prompting for the correction at S653 may include specifying the reason why the opportunity is presented when the prompting is based on the selection at S656.

If the opportunity to improve the current selection is not selected (S656=No), at S657, a determination is made as to whether the selections have ended.

If the selections have not ended (S657=No), the method of FIG. 6 prompts for a next selection at S658 and then returns to S651.

If the selections have ended (S657=Yes), the method of FIG. 6 ends at S680.

Figure 7A:
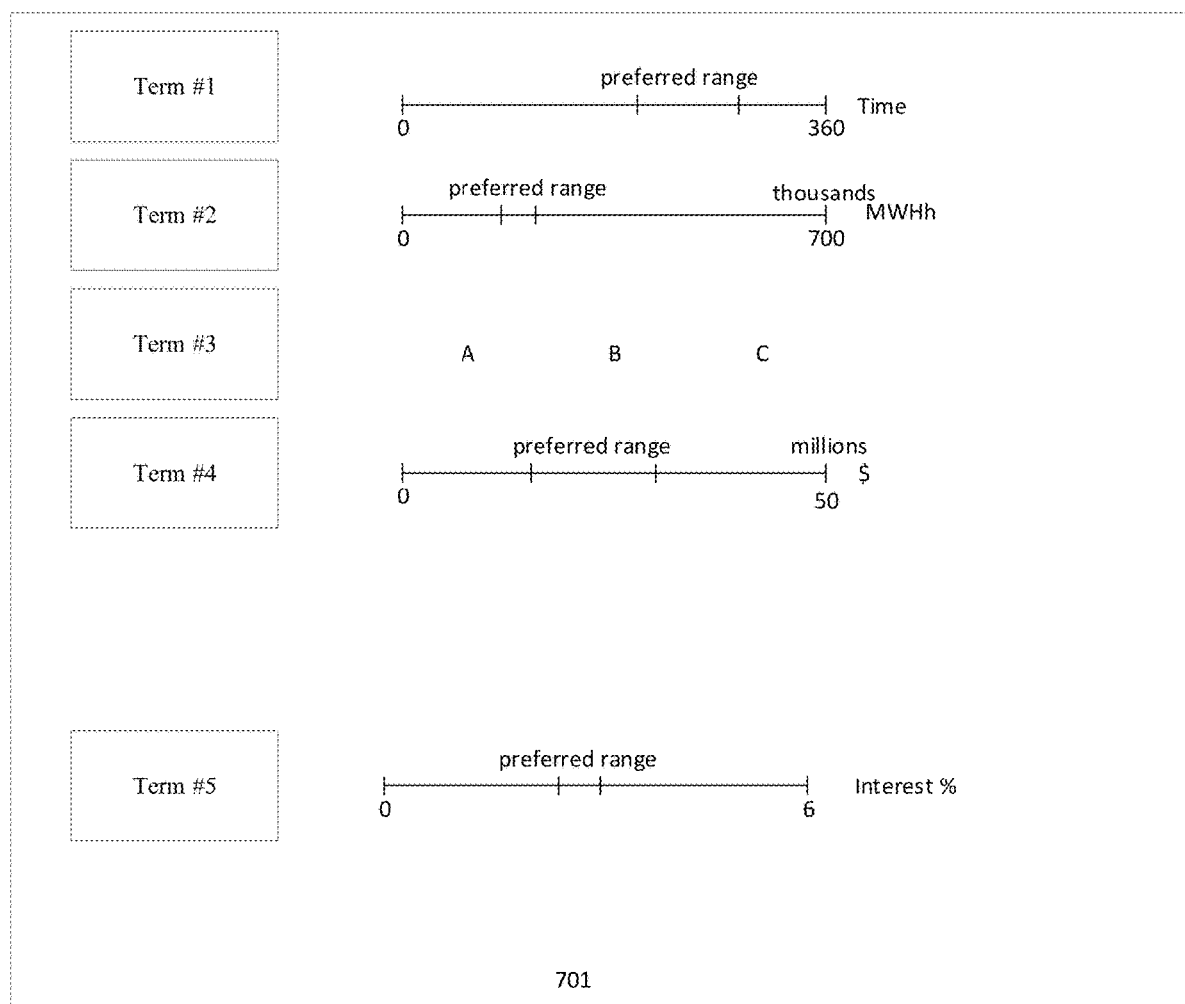
FIG. 7A illustrates a first template for renewable energy allocation based on guided position matching, in accordance with a representative embodiment.

FIG. 7A illustrates a first template for renewable energy allocation based on guided position matching, in accordance with a representative embodiment.

The first template may be provided with adjustable parameters initially preset consistently for each recipient of the first template. For example, a party in Chicago who wants to distribute a request for proposals for power plant capacity allocation may receive the same first template as a party in New York who wants to distribute a request for power plant capacity allocation. The party in Chicago and the party in New York may customize the initial parameters by adjusting parameters as described herein so that when the party in Chicago and the party in New York are done, the resultant templates have different set parameters. The resultant templates may include different terms even though both parties have the same underlying goal of procuring renewable energy. Both parties may each achieve their underlying goal of procuring renewable energy so long as minimum requirements are met by proposers who respond to their customized requests based on their completed first templates.

In FIG. 7A, five terms for the first template are listed in order from the top as term #1, term #2, term #3, term #4 and term #5. Embodiments described herein are not limited to five terms, and instead may include as few as one term and as many as thirty, fifty or more terms. Term formats may include, for example, integers, floating numbers, strings of characters, or dates, and can be organized by selectable options and or ranges.

In FIG. 7A, term #1 is defined by time units, and has settings that include a minimum of 0, a maximum set as 360, and a preferred range where the preferred minimum time and the preferred maximum time can be set. As an alternative to term #1 in FIG. 7A, a term may be set in terms of dates, such as specific calendar months and years including a start month, or an end month.

In FIG. 7A, term #2 is defined by megawatt-hours (MWh) units, and has settings that include a minimum of 0, a maximum set as 700,000, and a preferred range where the preferred minimum MWh and the preferred maximum MWh can be set. The MWh units for term #2 are measured in the thousands.

In FIG. 7A, term #3 is defined by incomparable choices that are not defined by a range. In FIG. 7A, the choices for term #3 include A, B and C. However, analogous choices may include shapes such as a circle, square and a triangle.

In FIG. 7A, term #4 is defined by dollar units, and has settings that include a minimum of 0, a maximum set as 50, and a preferred range where the preferred minimum time and the preferred maximum time can be set. The dollar units for term #4 are measured in the millions.

In FIG. 7A, term #5 is defined by interest percentage units, and has settings that include a minimum of 0, a maximum set as 6, and a preferred range where the preferred minimum interest percentage and the preferred maximum interest percentage can be set.

Another example of a term for which selectable parameters may be provided in a first template includes credit support amount per capacity of the facility or quantity of units of the renewable energy or financial exposure as measured by the requester and agreed to by the proposer, such as from $0 to $200,000/MW.

Among the parameters for terms that are selectable in the first template, a requester may be able to lock one or more parameters. A locked parameter may reflect that the requester does not wish to make the corresponding term negotiable. A locked parameter for a term may be shown by an icon such as a graphical representation of a lock, or may otherwise be indicated by the absence of alternatives. The locked parameter may be presented as a locked option that includes a single requirement that is not discretionary or negotiable, or that has a parameter or selectable range of one option, or that is at least presented as being non-discretionary and non-negotiable even though in reality a proposer may find a way to negotiate the locked option outside of the second template such as by communicating directly with the requester. For example, a free-form field may be presented as a field on a graphical user interface which can accept alphanumerical input from a user input device such as a keyboard, mouse or microphone.

In FIG. 7A, the first template does not show a free-form field. However, a first template may include at least one free-form field for entering discretionary input. For example, a free-form field may be provided for a user to specify numerical, alphabetical, or alphanumerical input that is not limited to a specific set of choices set by the requester.

Figure 7B:
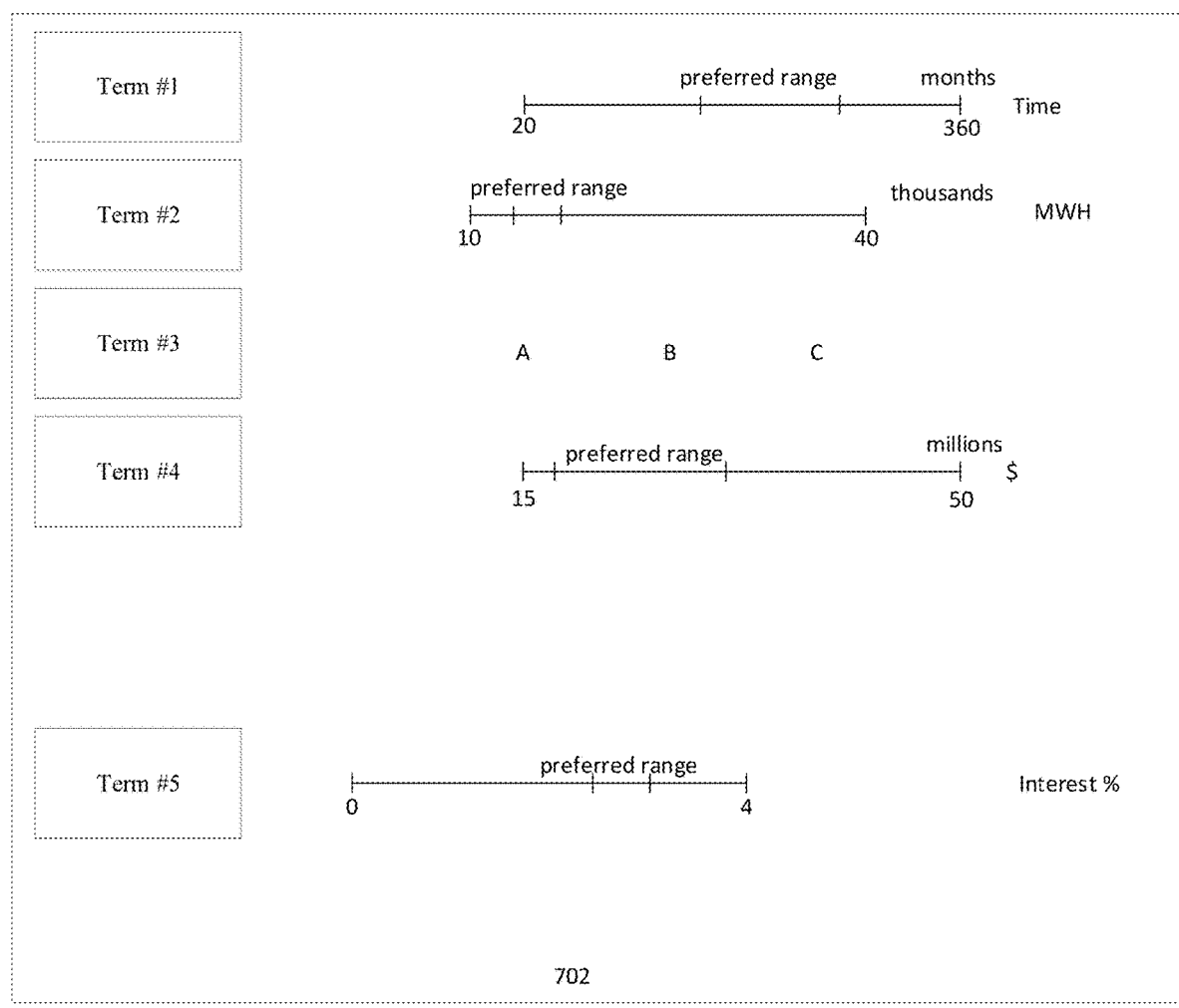
FIG. 7B illustrates a second template for renewable energy allocation based on guided position matching, in accordance with a representative embodiment.

FIG. 7B illustrates a second template for renewable energy allocation based on guided position matching, in accordance with a representative embodiment.

The second template may be provided to recipients who respond to a request to receive proposals, and is based on the selected options in the first template. Each recipient of the second template may adjust parameters as they see fit, at least initially. For example, a party in Baltimore who wants to submit a proposal for renewable energy allocation may receive the same second template as a party in Houston. The party in Baltimore and the party in Houston may customize the initial parameters in the second template by adjusting parameters as described herein so that when the party in Baltimore and the party in Houston are done, the resultant templates have different set parameters.

In FIG. 7B, the same five terms as in the first template are listed in order from the top as term #1, term #2, term #3, term #4 and term #5 in the second template. However, the parameters selected in the first template result in settings in the second template. For example, the lower limit for the range for term #1 has been updated to 20 from 0. Each recipient of the second template may select one or more parameter(s) in the second template, such as by further raising the lower limit, lowering the upper limit, and selecting a specific point in the range as a set parameter. Each recipient of the second template may further raise the lower limit, lower the upper limit, and select a specific point in the range for term #2. A proposer may also select a single point or selection that is either within or outside of the preferred range set by the requester.

In FIG. 7B, the lower limit for term #2 is raised to 10 and the upper limit for term #2 is lowered to 40. Each recipient of the second template may further raise the lower limit, lower the upper limit, and select a specific point in the range for term #2. A proposer may also select a single point or selection that is either within or outside of the preferred range set by the requester.

In FIG. 7B, the same three items are shown for term #3 as in the first template. A proposer may also select a single point or selection that is either within or outside of the preferred range set by the requester.

In FIG. 7B, the lower limit for term #4 is raised to 15 and the upper limit for term #2 is unchanged at 50. Each recipient of the second template may further raise the lower limit, lower the upper limit, and select a specific point in the range for term #4. A proposer may also select a single point or selection that is either within or outside of the preferred range set by the requester.

In FIG. 7B, the lower limit for term #5 is unchanged and the upper limit for term #5 is lowered to 4. Each recipient of the second template may further raise the lower limit, lower the upper limit, and select a specific point in the range for term #5. A proposer may also select a single point or selection that is either within or outside of the preferred range set by the requester.

A first template includes at least one selectable option for each of multiple commercial terms. The selectable option(s) for a commercial term in the first template include a set of at least one choice to initially define the commercial term. The choice(s) may include numerical choices, operative choices, descriptive choices. Selection of a choice in the first template establishes a range of selectable option(s) included in the second template. The range of selectable option(s)

may include an upper limit, a lower limit, a required option, a preferred option, a midpoint option, and/or a set of alternatives. The first template may include all possible permutations for commercial terms, and selections of selectable options for each of the commercial terms may be used as the basis for generating the second template. Selectable options in the second template may be limited by rules imposed based on other selections of selectable options in the second template, and the rules may be set by selectins of selectable options in the first template.

An example of a parameter that can be set by the requester of the first networked device in a second template and then countered by a proposer of the second networked device in a second template is the expected commercial operation date of the renewable energy project that is under development when the proposal is submitted to the requester. For example, the requester at the first networked device may prefer a commercial operation date between Apr. 1 2025 and Jun. 30 2025, but the proposer at the second networked device may counter with a range for a commercial operation date between Jun. 1 2025 and Aug. 1 2025.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Figure 8:
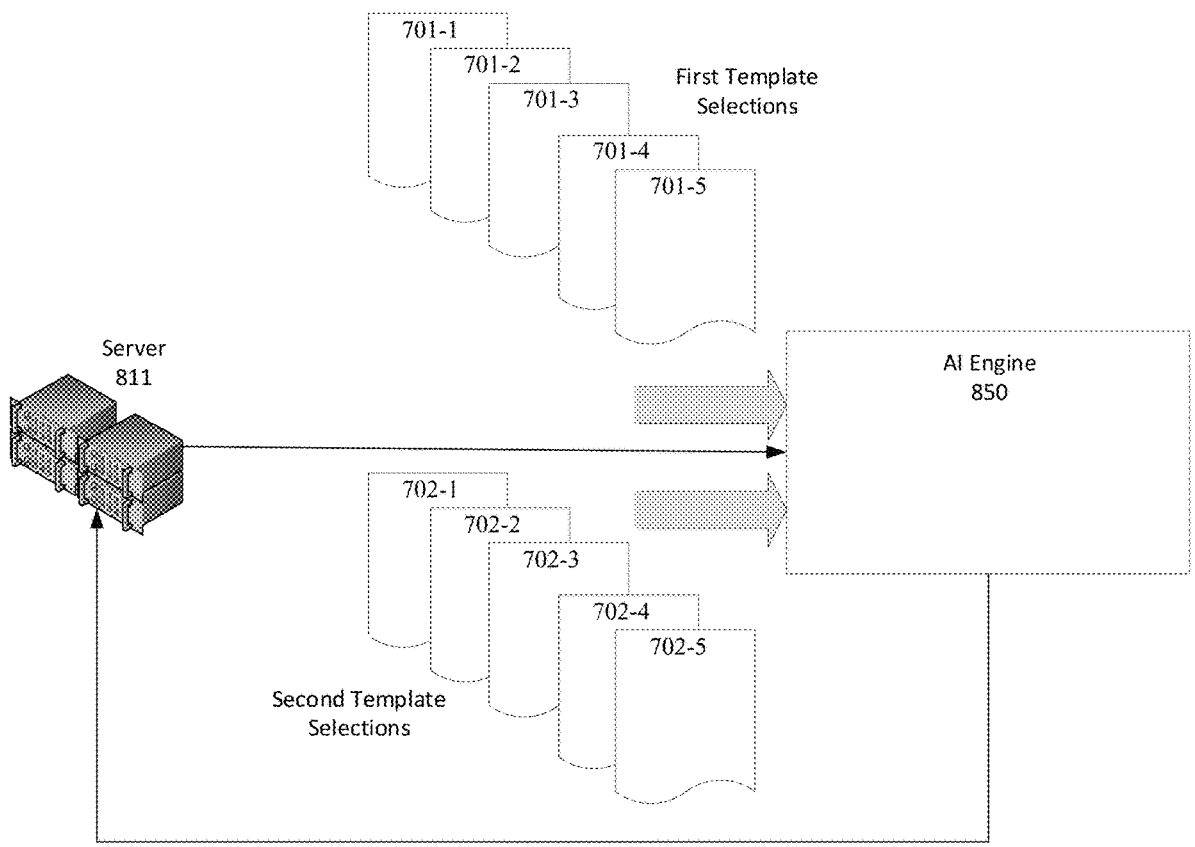
FIG. 8 illustrates an artificial intelligence implementation for renewable energy allocation based on guided position matching, in accordance with a representative embodiment.

FIG. 8 illustrates an artificial intelligence implementation for renewable energy allocation based on guided position matching, in accordance with a representative embodiment.

In FIG. 8, a server 811 provides first template selections and second template selections to an AI engine 850 (artificial intelligence engine). The first template selections include 701-1, 701-2, 701-3, 701-4 and 701-5, and the second template selections include 702-1, 702-2, 702-3, 702-4 and 702-5.

The AI engine 850 applies the first template selections and the second template selections as inputs to one or more artificial intelligence algorithms, and optimizes suggestions provided by the server to future requesters and proposers. For example, the AI engine 850 may accept inputs of information of the types of customized financial instruments being generated from the first template and the second template, and identify the most likely selections for each type of customized financial instrument based on first template selections and second template selections that resulted in successful implementation or performance of previous customized financial instruments.

The AI engine 850 may also customize first templates and second templates based on applying artificial intelligence to inputs from previous first templates and second templates, as well as information of types of customized financial instruments and information of the subject matter of the customized financial instruments (e.g., type of renewable energy and target market(s)) and type of parties participating as the requester and the proposer. As a result, the server 811 may accept inputs of information from a potential requester, and optimize a first template provided to the potential requester before the potential requester begins making selections of terms and parameters and rules for the first template. Similarly, the server 811 may accept inputs of information from a potential proposer responding to a requester, and optimize a second template provided to the potential proposer before the potential proposer begins making selections from the second template. The optimization may include rearranging the terms in a first template such as to place the most likely terms to be selected as the first terms presented. The optimization may also include suggesting a selection in a second template such as by suggesting a point on a timeline or a number in a free-form field. The optimization may also include pre-loading parameters and rules that are known to result in high-quality proposals with a high chance of success.

Figure 9:
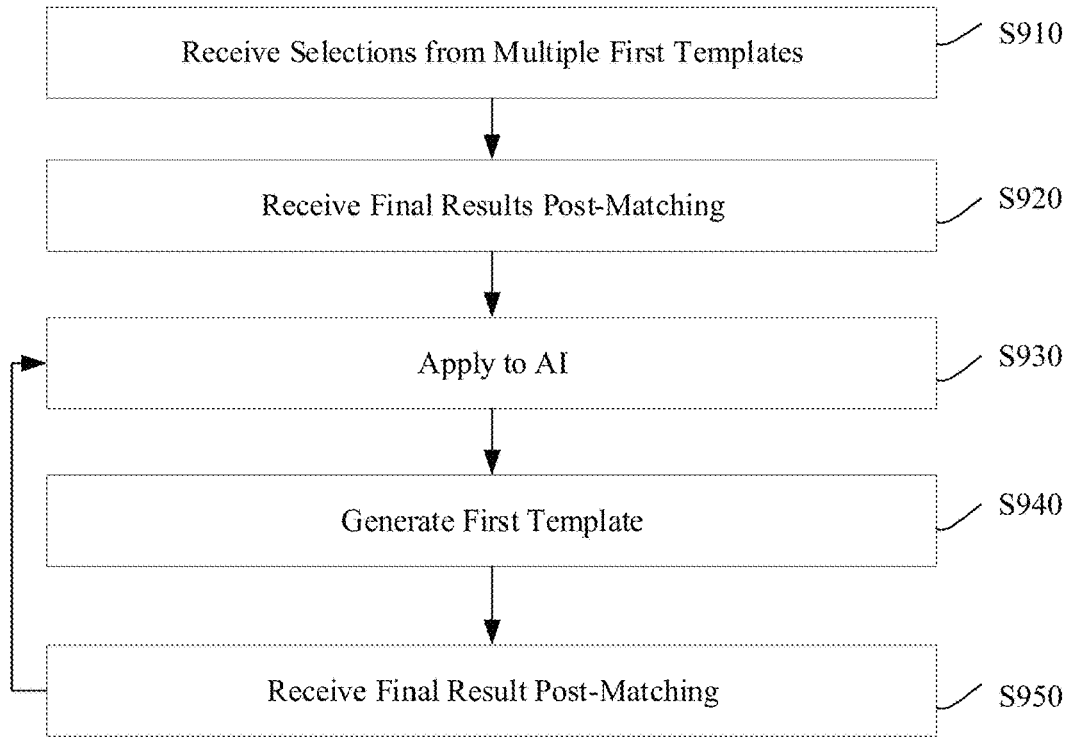
FIG. 9 illustrates another method for renewable energy allocation based on guided position matching, in accordance with a representative embodiment.

FIG. 9 illustrates another method for renewable energy allocation based on guided position matching, in accordance with a representative embodiment.

The method of FIG. 9 starts at S910 by receiving selections from multiple first templates, or by receiving selections from multiple first templates and multiple second templates. The selections may be selections received by the server 811 and provided as learning inputs to the AI engine 850.

At S920, the method of FIG. 9 includes receiving final results post-matching. That is, at S920, the method of FIG. 9 includes identifying proposals and matching requests. At S920, the final results may include completed first templates and completed second templates such as those created by buyers or sellers that were matched to the completed first templates.

At S930, the method of FIG. 9 includes applying the final results to artificial intelligence. The artificial intelligence may be applied to identify any optimizations that can be provided for future first templates and second templates, such as whether successful proposals for a particular type of subject matter in first templates consistently include a selection of a particular value or range for a term.

At S940, a first template is generated. The first template may reflect customization from the AI engine 850 based on applying the final results to artificial intelligence implemented by the AI engine 850 at S930.

At S950, the method of FIG. 9 includes receiving final results post-matching. The final results post-matching at S950 may be identical to receiving final results post-matching at S920.

Figure 10:
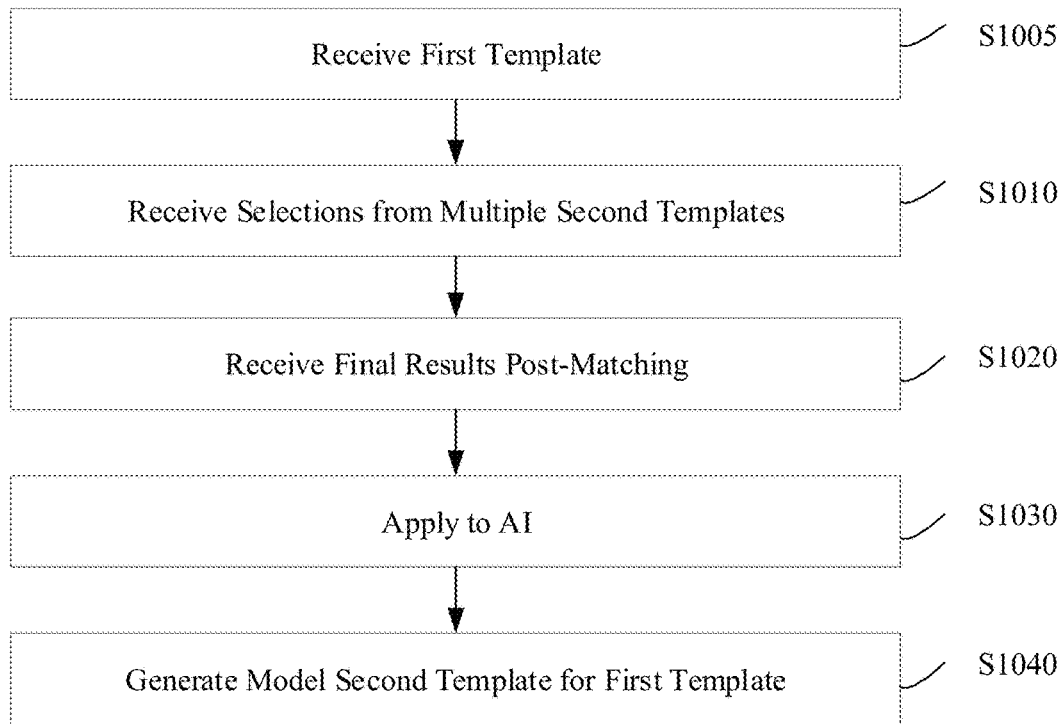
FIG. 10 illustrates another method for renewable energy allocation based on guided position matching, in accordance with a representative embodiment.

FIG. 10 illustrates another method for renewable energy allocation based on guided position matching, in accordance with a representative embodiment.

At S1005, the method of FIG. 10 includes receiving a first template. The first template received at S1005 may be a finalized first template with completed selections.

At S1010, the method of FIG. 10 includes receiving selections from multiple second templates. The selections from the second templates received at S1010 may be intermediate and finalized selections from multiple second templates that correspond to the first template received at S1005.

For example, a single request to receive proposals may result in 2, 5 or more than 5 proposals.

At S1020, the final results post-matching are received. The final results may reflect both successful and unsuccessful completed second templates.

At S1030, the final results post-matching are applied to artificial intelligence such as the artificial intelligence implemented by the AI engine 850.

At S1040, the method of FIG. 10 includes generating a model second template for the first template. The model second template may be a model that reflects optimized suggested selections of parameters in a second template corresponding to a first template. The model second template may be used for the most common types of first templates generated in renewable energy allocation based on guided position matching. In an embodiment, the model second template generated at S1040 is generated dynamically only once a new completed first template is received.

Figure 11:
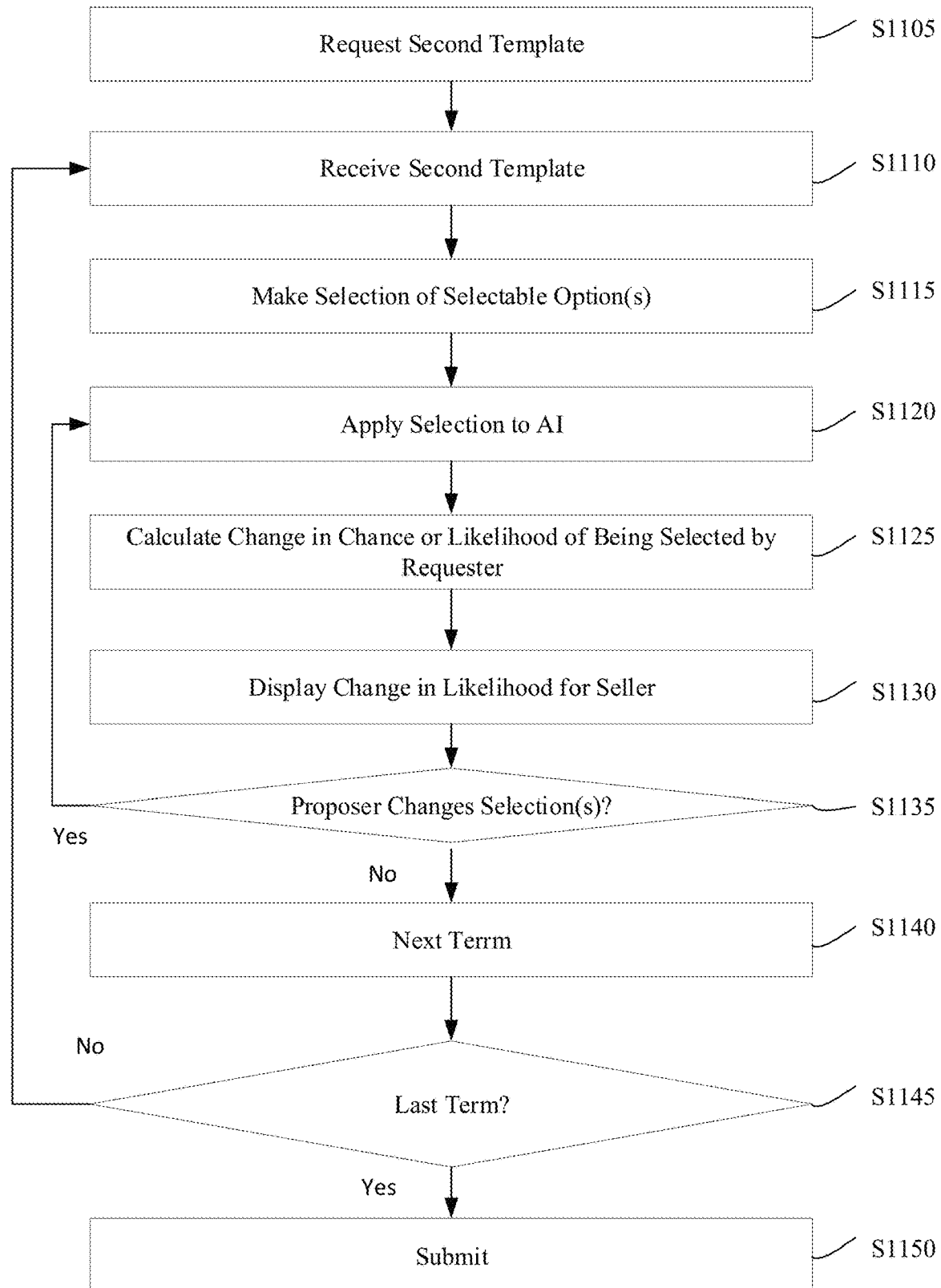
FIG. 11 illustrates another method for renewable energy allocation based on guided position matching, in accordance with a representative embodiment.

FIG. 11 illustrates another method for renewable energy allocation based on guided position matching, in accordance with a representative embodiment.

In the method of FIG. 11, a proposer at the second networked device requests to receive the second template from the requester at the first networked device at S1105.

At S1110, the proposer at the second networked device receives the second template.

At S1115, the proposer at the second networked device makes a selection of one or more selectable option(s).

At S1120, the selection from S1115 is applied to artificial intelligence. At S1125, the artificial intelligence calculated a change in the chance or likelihood of the proposer's response based on the second template being selected by the requester. The calculation at S1125 may be based on a machine learning algorithm analyzing the combination of selections in the second template and determining the relative chance or likelihood that the proposer's response will be selected by the requester if the current combination of selections was submitted with no changes. For example, if term #1 had three selectable options and option A was selected by the proposer, the artificial intelligence may predict that the proposer's chance of being selected decreased by 4%.

At S1130, the method of FIG. 11 includes displaying the change in the chance or likelihood that the combination of selections in the second template will be selected by the requester. The display at S1130 is provided to the proposer at the second networked device.

At S1135, the method of FIG. 11 includes determining whether the proposer at the second networked device decides to change their selection. If the selection is changed (S1135=Yes), the process will return to S1120 and the new selection will be applied to the artificial intelligence. If the proposer does not want to make a new selection (S1135=No), the method of FIG. 11 continues to S1140.

At S1145, the method of FIG. 11 includes determining if the last selection was for the last term or if other selections remain to be made, including changes to previous selections. If there are additional selections (S1145=No), the method of FIG. 11 includes returning to S1110. Otherwise (S1145=Yes), the method of FIG. 11 includes submitting the completed second template to the requester at S1150.

Accordingly, renewable energy allocation based on guided position matching enables proposers to be automatically guided towards resolutions with acceptable terms. The use of first templates and second templates as described herein enables faster development of new renewable energy sources by enabling participants to systematically and dynamically incorporate selectable options from the first templates and the second templates into offers and bids in a manner that guides proposers towards a successful agreement. Nevertheless, renewable energy allocation based on guided position matching is not limited as an application to specific details described herein, and instead is applicable to additional embodiments in which the requesters and proposers are negotiating other forms of complex agreements such as government contracts, mergers and acquisitions, other bespoke commodity agreements, intellectual property licensing agreements, and other forms of agreements with complex terms that typically require inefficient uses of time and effort before a satisfactory conclusion is reached.

Although renewable energy allocation based on guided position matching has been described with reference to several exemplary embodiments, it is understood that the words that have been used are words of description and illustration, rather than words of limitation. Changes may be made within the purview of the appended claims, as presently stated and as amended, without departing from the scope and spirit of renewable energy allocation based on guided position matching in its aspects. Although renewable energy allocation based on guided position matching has been described with reference to particular means, materials and embodiments, renewable energy allocation based on guided position matching is not intended to be limited to the particulars disclosed; rather renewable energy allocation based on guided position matching extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

We claim:

1. A system, comprising:
 a memory that stores instructions; and
 a processor that processes the instructions, wherein, when executed by the processor, the instructions cause the system to:
 send a first template of selectable options to a first computer controlled by a first party;
 receive, by a server, a second template with selections based on a subset of the selectable options from the first template from the first computer;
 create, based on the selections based on the subset of the selectable options from the first template, a customized third template of selectable options;
 provide, to a second computer controlled by a second party, the customized third template of selectable options;
 receive, by the server, selections based on the selectable options in the customized third template from the second computer; and
 determine when the selections based on the selectable options in the customized third template from the second computer match the selections based on the subset of the selectable options from the first template from the first computer,
 wherein renewable energy from the power plant is allocated based on determining when the selections based on the selectable options in the customized third template from the second computer match the second template with selections based on the subset of the selectable options from the first template from the first computer.

2. The system of claim 1, wherein the instructions further cause the system to:
 send a request to receive one or more proposals for allocating renewable energy from the power plant; and
 receive, by the server from the second computer, a request to submit a proposal for allocating renewable energy from the power plant.

3. The system of claim 2, wherein the customized third template of selectable options is sent to the second computer based on receiving, by the server from the second computer, the request to submit a proposal for allocating renewable energy from the power plant.

4. The system of claim 2,
 wherein, when executed by the processor, the instructions cause the system to further:
 receive, by the server from a third computer controlled by a third party, a request to submit a proposal for allocating renewable energy from the power plant;
 receive by the server selections based on the selectable options in the customized third template from the third computer; and
 determine when the selections based on the selectable options in the customized third template from the third computer match the selections based on the subset of the selectable options from the first template from the first computer,
 wherein renewable energy from the power plant is allocated based on determining when the selections based on the selectable options in the customized third template from the third computer match the selections based on the subset of the selectable options from the first template from the first computer.

5. The system of claim 4,
 wherein, when executed by the processor, the instructions cause the system to further:
 compare the selections based on the selectable options in the customized third template from the second computer with the selections based on the selectable options in the customized third template from the third computer, and
 identify, from the selections based on the selectable options in the customized third template from the second computer and the selections based on the selectable options in the customized third template from the third computer, feedback to provide to the second computer and the third computer based on which of the selections based on the selectable options in the customized third template from the second computer and the selections based on the selectable options in the customized third template from the third computer is most mismatched with the selections based on the subset of the selectable options from the first template from the first computer.

6. The system of claim 1, wherein, when executed by the processor, the instructions cause the system to further:
 restrict a combination of selections based on the selectable options in the customized third template.

7. The system of claim 1, wherein, when executed by the processor, the instructions cause the system to further:
 feed, to artificial intelligence, selections based on the selectable options in the customized third template from the second computer, selections based on the subset of the selectable options in the first template from the first computer, and a determination that the selections based on the selectable options in the customized third template from the second computer match the selections based on the subset of the selectable options from the first template from the first computer.

8. The system of claim 1,
 wherein, when executed b the processor, the instructions cause the system to further:
 interact with the second computer to guide the second party and provide real-time feedback for the second party based on the selections based on the selectable options in the customized third template from the second computer, wherein guidance provided from the system includes a representation of a risk of a mismatch or rule violation for at least one selection of the selectable options in the customized third template from the second computer.

9. The system of claim 1,
wherein the determination that the selections based on the selectable options in the customized third template from the second computer match the selections based on the subset of the selectable options from the first template from the first computer is based on weights applied to each of a plurality of the selectable options in the customized third template.

10. The system of claim 1,
wherein the customized third template comprises:
the selectable options;
at least one locked option that includes a single requirement provided from the first computer, and
at least one free-form field for entering discretionary input for an option.

* * * * *